United States Patent
Luo et al.

(10) Patent No.: US 11,743,781 B2
(45) Date of Patent: *Aug. 29, 2023

(54) SYSTEMS AND METHODS FOR REPORTING OF BEAM CORRESPONDENCE STATE

(71) Applicant: QUALCOMM Incorporated, San Diego, CA (US)

(72) Inventors: Jianghong Luo, Skillman, NJ (US); Navid Abedini, Basking Ridge, NJ (US); Junyi Li, Fairless Hills, PA (US); Tao Luo, San Diego, CA (US); Muhammad Nazmul Islam, Littleton, MA (US); Karl Georg Hampel, Hoboken, NJ (US); Juergen Cezanne, Ocean Township, NJ (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/454,791

(22) Filed: Nov. 12, 2021

(65) Prior Publication Data

US 2022/0150764 A1    May 12, 2022

Related U.S. Application Data

(63) Continuation of application No. 16/554,300, filed on Aug. 28, 2019, now Pat. No. 11,178,586.
(Continued)

(51) Int. Cl.
*H04W 4/00* (2018.01)
*H04W 36/00* (2009.01)
*H04W 72/044* (2023.01)

(52) U.S. Cl.
CPC .... *H04W 36/0058* (2018.08); *H04W 36/0069* (2018.08); *H04W 36/0072* (2013.01); *H04W 72/046* (2013.01); *H04W 36/0009* (2018.08)

(58) Field of Classification Search
CPC .......... H04B 7/02; H04B 7/04; H04B 7/0404; H04B 7/0617; H04B 7/0695; H04B 7/086;
(Continued)

(56) References Cited

U.S. PATENT DOCUMENTS 10,148,337 B2   12/2018 Ng et al.
10,433,312 B2   10/2019 Ahn et al.
(Continued)

OTHER PUBLICATIONS

Nokia, Alcatel-Lucent Shanghai Bell, Impact of UE TX/RX Beam correspondence and non-correspondence, 3GPP TSG-RAN WG1 #87 Reno, U.S.A., R1-1612298, 6 pages, Nov. 14-18, 2016.*
(Continued)

*Primary Examiner* — Frank Duong
(74) *Attorney, Agent, or Firm* — Patterson & Sheridan, LLP/QUALCOMM Incorporated

(57) ABSTRACT

Certain aspects of the present disclosure provide techniques for reporting of a beam correspondence state. Certain aspects provide a method for wireless communication by a first wireless device. The method includes, based on detecting the occurrence of a triggering event, determining one or more beam correspondence states for one or more beams or portions of beams used by the first wireless device for communication. The method further includes transmitting one or more indications of the one or more beam correspondence states to a second wireless device, wherein the one or more indications of the one or more beam correspondence states indicate whether the first wireless device has the capability of beam correspondence between the one or more (Continued)

beams and corresponding one or more transmit or receive beams used by the first wireless device for communication.

40 Claims, 17 Drawing Sheets

Related U.S. Application Data

(60) Provisional application No. 62/740,556, filed on Oct. 3, 2018.

(58) Field of Classification Search
CPC ......... H04B 7/088; H04B 7/10; H04W 16/28; H04W 24/10; H04W 36/0009; H04W 36/0058; H04W 36/0069; H04W 36/0072; H04W 52/0235; H04W 72/04; H04W 72/0406; H04W 72/046; H04W 72/0473; H04W 72/08
See application file for complete search history.

(56) References Cited

U.S. PATENT DOCUMENTS

| | | |
|---|---|---|
| 10,560,851 B2 | 2/2020 | Guo et al. |
| 10,567,065 B2 | 2/2020 | Kundargi et al. |
| 10,735,157 B2 | 8/2020 | Liu et al. |
| 10,735,162 B2 | 8/2020 | Jung et al. |
| 10,798,588 B2 | 10/2020 | Yu et al. |
| 10,951,300 B2 | 3/2021 | Kundargi et al. |
| 11,178,586 B2 | 11/2021 | Luo et al. |
| 2018/0227772 A1 | 8/2018 | Yu et al. |
| 2018/0227898 A1 | 8/2018 | Noh et al. |
| 2019/0097874 A1 | 3/2019 | Zhou et al. |
| 2019/0103908 A1 | 4/2019 | Yu et al. |
| 2020/0136708 A1 | 4/2020 | Pan et al. |

OTHER PUBLICATIONS

Samsung, RA procedure with and without beam correspondence, 3GPP TSG RAN WG1 #87 Reno, USA, R1-1612466, 5 pages, Nov. 14-18, 2016.*

3GPP TR 38.802: "3rd Generation Partnership Project; Technical Specification Group Radio Access Network; Study on New Radio Access Technology Physical Layer Aspects (Release 14)", 3GPP Standard, Technical Report, 3GPP TR 38.802, 3rd Generation Partnership Project (3GPP), Mobile Competence Centre, 650, Route Des Lucioles, F-06921 Sophia-Antipolis Cedex, France, vol. RAN WG1, No. V14.2.0, Sep. 26, 2017 (Sep. 26, 2017), XP051337340, [retrieved on Sep. 26, 2017], pp. 1-143.

3GPP TS 23.401: "3rd Generation Partnership Project; Technical Specification Group Services and System Aspects; General Packet Radio Service (GPRS) Enhancements for Evolved Universal Terrestrial Radio Access Network (E-UTRAN) Access (Release 15)", 3GPP Standard, Technical Specification, 3GPP TS 23.401, 3rd Generation Partnership Project (3GPP), Mobile Competence Centre, 650, Route Des Lucioles, F-06921 Sophia-Antipolis Cedex, France, vol. SA WG2, No. V15.4.0, Jun. 19, 2018, pp. 1-410, XP051472859.

3GPP TS 38.331: "3rd Generation Partnership Project; Technical Specification Group Radio Access Network; NR; Radio Resource Control (RRC) Protocol Specification (Release 15)", 3GPP Standard, Technical Specification, 3GPP TS 38.331, 3rd Generation Partnership Project (3GPP), Mobile Competence Centre, 650, Route Des Lucioles, F-06921, Sophia-Antipolis Cedex, France, vol. RAN WG1, No. V15.2.1, Jun. 21, 2018 (Jun. 21, 2018), XP051473085, pp. 1-303, [retrieved on Jun. 21, 2018], pp. 36-43, 51, p. 82, pp. 91-92.

"3rd Generation Partnership Project, Technical Specification Group Radio Access Network, Evolved Universal Terrestrial Radio Access (E-UTRA), Radio Resource Control (RRC), Protocol Specification (Release 13)", 3GPP TS 36.331, V13.8.1, 644 pages, Jan. 2018.

ETSI TR 138 912, V14.0.0, "3rd Generation Partnership Project; Technical Specification Group Radio Access Network; Study on New Radio (NR) Access Technology (Release 14)", 3GPP Standard, Technical Specification, 3GPP TR 38.912, 3rd Generation Partnership Project (3GPP), Mobile Competence Centre, 650, Route Des Lucioles, F-06921 Sophia-Antipolis Cedex, France, vol. TSG RAN, No. V14.0.0, Mar. 24, 2017 (Mar. 24, 2017), XP051295707, 77 pages, https://portal.3gpp.org/Desktopmodules/Specifications/SpecificationDetails.aspx?specificationId=3059.

International Preliminary Report on Patentability—PCT/US2019/048851, The International Bureau of WIPO—Geneva, Switzerland, Apr. 15, 2021.

International Search Report and Written Opinion—PCT/US2019/048851—ISA/EPO—Oct. 24, 2019.

Mediatek Inc: "Discussion on UL Beam Management Procedure", 3GPP TSG RAN WG1 Meeting #88, 3GPP Draft; R1-1702731 Discussion On UL Beam Management Procedure Final, 3rd Generation Partnership Project (3GPP), Mobile Competence Centre ; 650, Route Des Lucioles; F-06921 Sophia-Antipolis Cedex, vol. RAN WG1, No. Athens, Greece; 20170213- 20170217, Feb. 12, 2017 (Feb. 12, 2017), XP051209878, 4 Pages, Retrieved from the Internet: URL:http://www.3gpp.org/ftp/Meetings_3GPP_SYNC/RAN1/Docs/ [retrieved on Feb. 12, 2017]. sections 2-4.

Samsung: "Discussion on UL Beam Management", 3GPP Draft, R1-1705341, 3GPP TSG RAN WG1 Meeting #88bis, 3rd Generation Partnership Project (3GPP), Mobile Competence Centre, 650, Route Des Lucioles, F-06921 Sophia-Antipolis Cedex, France, vol. RAN WG1, No. Spokane, USA, 20170403-20170407, Apr. 2, 2017 (Apr. 2, 2017), XP051243471, 6 Pages, Retrieved from the Internet: URL:http://www.3gpp.org/ftp/Meetings_3GPP_SYNC/RAN1/Docs/ [retrieved on Apr. 2, 2017] Sections 2.3.

Samsung: "Impact of Beam Correspondence", 3GPP Draft; R1-1612510, 3rd Generation Partnership Project (3GPP), Mobile Competence Centre; 650, Route Des Lucioles; F-06921 Sophia-Antipolis Cedex; France, vol. RAN WG1, No. Reno, USA; 20161114-20161118, Nov. 4, 2016 (Nov. 4, 2016), XP051189386, 4 Pages, Retrieved from the Internet: URL:http://www.3gpp.org/ftp/tsg_ran/WG1_RL1/TSGR1_87/Docs/ [retrieved on Nov. 4, 2016].

Samsung: "NR 4-Step Random Access Procedure", 3GPP Draft; R1-1705325, 3rd Generation Partnership Project (3GPP), Mobile Competence Centre; 650, Route Des Lucioles; F-06921 Sophia-Antipolis Cedex; France, vol. RAN WG1, No. Spokane, Washington, USA; 20170403-20170407, Apr. 2, 2017 (Apr. 2, 2017), XP051243455, 13 Pages, Retrieved from the Internet: URL:http://www.3gpp.org/ftp/Meetings_3GPP_SYNC/RAN1/Docs/ [retrieved on Apr. 2, 2017], para 2.1 and 2.2.

\* cited by examiner

SYSTEMS AND METHODS FOR REPORTING OF BEAM CORRESPONDENCE STATE

CROSS-REFERENCE TO RELATED APPLICATION(S)

This application is a continuation of U.S. patent application Ser. No. 16/554,300, filed Aug. 28, 2019, which claims benefit of and priority to U.S. Provisional Patent Application No. 62/740,556, filed Oct. 3, 2018, the entire contents of each of which are incorporated herein by reference.

INTRODUCTION

Aspects of the present disclosure relate to wireless communications, and more particularly, to methods and apparatus for beam management.

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a first wireless device. The method includes detecting occurrence of a triggering event corresponding to a change of at least one beam correspondence state of the first wireless device. The method further includes, based on detecting occurrence of the triggering event, determining one or more beam correspondence states for one or more beams or portions of beams used by the first wireless device for communication. The method further includes transmitting one or more indications of the one or more beam correspondence states to a second wireless device, wherein the one or more indications of the one or more beam correspondence states indicate whether the first wireless device has the capability of beam correspondence between the one or more beams and corresponding one or more transmit or receive beams used by the first wireless device for communication.

Certain aspects provide a method for wireless communication by a first wireless device. The method includes receiving one or more indications of one or more beam correspondence states for one or more beams or portions of beams used by a second wireless device for communication from the second wireless device, wherein the one or more indications of the one or more beam correspondence states indicate whether the second wireless device has the capability of beam correspondence between the one or more beams and corresponding one or more transmit or receive beams used by the second wireless device for communication. The method further includes selecting an approach for beam management for the second wireless device based on the received one or more indications.

Certain aspects provide a method for wireless communication by a first wireless device. The method includes generating at least one indication of at least one beam correspondence state and additional information indicating a subset of beams of a plurality of beams used by the first wireless device for communication. The method further includes transmitting the indication to a second wireless device, wherein the indication of the at least one beam correspondence state indicates whether the first wireless device has the capability of beam correspondence between the subset of beams and corresponding one or more transmit or receive beams used by the first wireless device for communication.

Certain aspects provide a method for wireless communication by a first wireless device. The method includes receiving, from a second wireless device, at least one indication of at least one beam correspondence state of the second wireless device and additional information indicating a subset of beams of a plurality of beams used by the second wireless device for communication, wherein the indication of the at least one beam correspondence state indicates whether the second wireless device has the capability of beam correspondence between the subset of beams and corresponding one or more transmit or receive beams used by the second wireless device for communication. The method further includes selecting an approach for beam management based on the at least one indication of the at least one beam correspondence state.

Certain aspects provide a first wireless device. The first wireless device includes a memory and a processor coupled to the memory. The memory and processor are configured to detect occurrence of a triggering event corresponding to a change of at least one beam correspondence state of the first wireless device. The method further includes, based on detecting occurrence of the triggering event, determining one or more beam correspondence states for one or more beams or portions of beams used by the first wireless device for communication. The memory and processor are configured to transmit one or more indications of the one or more beam correspondence states to a second wireless device, wherein the one or more indications of the one or more beam correspondence states indicate whether the first wireless device has the capability of beam correspondence between the one or more beams and corresponding one or more transmit or receive beams used by the first wireless device for communication.

Certain aspects provide a first wireless device. The first wireless device includes a memory and a processor coupled to the memory. The memory and processor are configured to receive one or more indications of one or more beam correspondence states for one or more beams or portions of beams used by a second wireless device for communication from the second wireless device, wherein the one or more indications of the one or more beam correspondence states indicate whether the second wireless device has the capability of beam correspondence between the one or more beams and corresponding one or more transmit or receive beams used by the second wireless device for communication. The memory and processor are configured to select an approach for beam management for the second wireless device based on the received one or more indications.

Certain aspects provide a first wireless device. The first wireless device includes a memory and a processor coupled to the memory. The memory and processor are configured to generate at least one indication of at least one beam correspondence state and additional information indicating a subset of beams of a plurality of beams used by the first wireless device for communication. The memory and processor are configured to transmit the indication to a second wireless device, wherein the indication of the at least one beam correspondence state indicates whether the first wireless device has the capability of beam correspondence between the subset of beams and corresponding one or more transmit or receive beams used by the first wireless device for communication.

Certain aspects provide a first wireless device. The first wireless device includes a memory and a processor coupled to the memory. The memory and processor are configured to receive, from a second wireless device, at least one indication of at least one beam correspondence state of the second wireless device and additional information indicating a subset of beams of a plurality of beams used by the second wireless device for communication, wherein the indication of the at least one beam correspondence state indicates whether the second wireless device has the capability of beam correspondence between the subset of beams and corresponding one or more transmit or receive beams used by the second wireless device for communication. The memory and processor are configured to select an approach for beam management based on the at least one indication of the at least one beam correspondence state.

Certain aspects provide a non-transitory computer readable medium having instructions stored thereon for performing a method for wireless communication by a first wireless device. The method includes detecting occurrence of a triggering event corresponding to a change of at least one beam correspondence state of the first wireless device. The method further includes, based on detecting occurrence of the triggering event, determining one or more beam correspondence states for one or more beams or portions of beams used by the first wireless device for communication. The method further includes transmitting one or more indications of the one or more beam correspondence states to a second wireless device, wherein the one or more indications of the one or more beam correspondence states indicate whether the first wireless device has the capability of beam correspondence between the one or more beams and corresponding one or more transmit or receive beams used by the first wireless device for communication.

Certain aspects provide a non-transitory computer readable medium having instructions stored thereon for performing a method for wireless communication by a first wireless device. The method includes receiving one or more indications of one or more beam correspondence states for one or more beams or portions of beams used by a second wireless device for communication from the second wireless device, wherein the one or more indications of the one or more beam correspondence states indicate whether the second wireless device has the capability of beam correspondence between the one or more beams and corresponding one or more transmit or receive beams used by the second wireless device for communication. The method further includes selecting an approach for beam management for the second wireless device based on the received one or more indications.

Certain aspects provide a non-transitory computer readable medium having instructions stored thereon for performing a method for wireless communication by a first wireless device. The method includes generating at least one indication of at least one beam correspondence state and additional information indicating a subset of beams of a plurality of beams used by the first wireless device for communication. The method further includes transmitting the indication to a second wireless device, wherein the indication of the at least one beam correspondence state indicates whether the first wireless device has the capability of beam correspondence between the subset of beams and corresponding one or more transmit or receive beams used by the first wireless device for communication.

Certain aspects provide a non-transitory computer readable medium having instructions stored thereon for performing a method for wireless communication by a first wireless device. The method includes receiving, from a second wireless device, at least one indication of at least one beam correspondence state of the second wireless device and additional information indicating a subset of beams of a plurality of beams used by the second wireless device for communication, wherein the indication of the at least one beam correspondence state indicates whether the second wireless device has the capability of beam correspondence between the subset of beams and corresponding one or more transmit or receive beams used by the second wireless device for communication. The method further includes selecting an approach for beam management based on the at least one indication of the at least one beam correspondence state.

Certain aspects provide a first wireless device. The first wireless device includes means for detecting occurrence of a triggering event corresponding to a change of at least one beam correspondence state of the first wireless device. The first wireless device further includes means for, based on detecting occurrence of the triggering event, determining one or more beam correspondence states for one or more beams or portions of beams used by the first wireless device for communication. The first wireless device further includes means for transmitting one or more indications of the one or more beam correspondence states to a second wireless device, wherein the one or more indications of the one or more beam correspondence states indicate whether the first wireless device has the capability of beam correspondence between the one or more beams and corresponding one or more transmit or receive beams used by the first wireless device for communication.

Certain aspects provide a first wireless device. The first wireless device includes means for receiving one or more indications of one or more beam correspondence states for one or more beams or portions of beams used by a second wireless device for communication from the second wireless device, wherein the one or more indications of the one or more beam correspondence states indicate whether the second wireless device has the capability of beam correspondence between the one or more beams and corresponding one or more transmit or receive beams used by the second wireless device for communication. The first wireless device further includes means for selecting an approach for beam management for the second wireless device based on the received one or more indications.

Certain aspects provide a first wireless device. The first wireless device includes means for generating at least one indication of at least one beam correspondence state and additional information indicating a subset of beams of a plurality of beams used by the first wireless device for communication. The first wireless device further includes means for transmitting the indication to a second wireless device, wherein the indication of the at least one beam correspondence state indicates whether the first wireless device has the capability of beam correspondence between the subset of beams and corresponding one or more transmit or receive beams used by the first wireless device for communication.

Certain aspects provide a first wireless device. The first wireless device includes means for receiving, from a second wireless device, at least one indication of at least one beam correspondence state of the second wireless device and additional information indicating a subset of beams of a plurality of beams used by the second wireless device for communication, wherein the indication of the at least one beam correspondence state indicates whether the second wireless device has the capability of beam correspondence between the subset of beams and corresponding one or more transmit or receive beams used by the second wireless device for communication. The first wireless device further includes means for selecting an approach for beam management based on the at least one indication of the at least one beam correspondence state.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
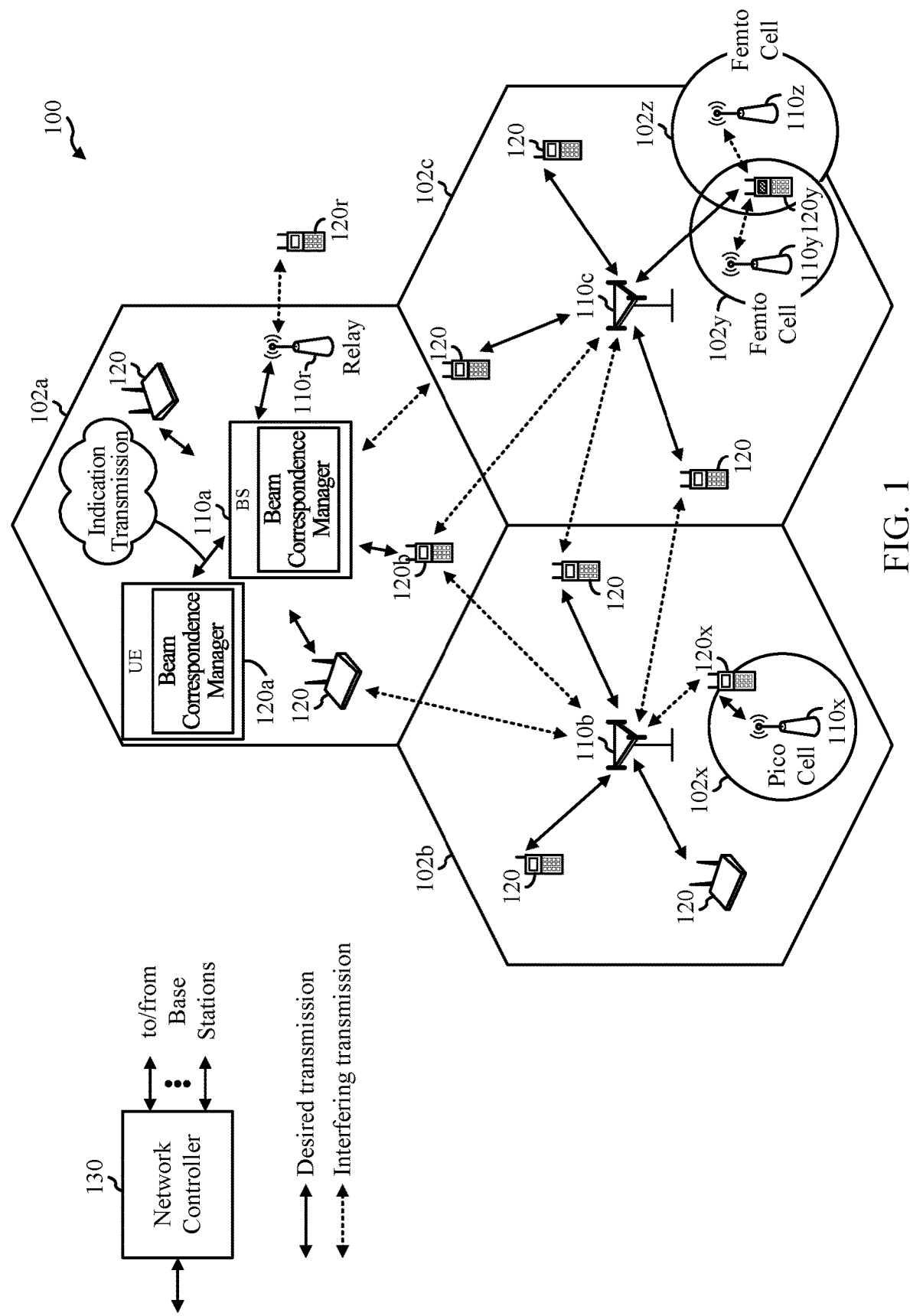
FIG. 1 is a block diagram conceptually illustrating an example telecommunications system, in accordance with certain aspects of the present disclosure.

Aspects of the present disclosure provide apparatus, methods, processing systems, and computer readable mediums for reporting of beam correspondence state.

A wireless device, such as a BS, UE, integrated backhaul and access network (IAB-network) node (IAB-node) that supports a mobile telecommunication (MT) function, etc., may be capable of transmit/receive (Tx/Rx) beam correspondence. Beam correspondence relates to receive (Rx) beams and transmit (Tx) beams which are spatial beams for receiving and transmitting signals formed by beamforming by a wireless device.

Beam correspondence may mean that a Tx beam may be used to determine a corresponding Rx beam or an Rx beam may be used to determine a corresponding Tx beam for wireless communications. As discussed, a UE and BS may each be capable of beamforming for both receiving and transmitting wireless signals. Accordingly, each of the UE and BS may receive signals directionally over one or more respective Rx beams (referred to as UE Rx beams for the UE and BS Rx beams for the BS), and each of the UE and BS may transmit signals directionally over one or more respective Tx beams (referred to as UE Tx beams for the UE and BS Tx beams for the BS). In certain aspects, beam correspondence as discussed herein corresponds to beam correspondence as defined in 3GPP TR 38.802.

For example, a BS is capable or has the capability of Tx/Rx beam correspondence if at least one of the following conditions is satisfied: 1) a BS is able to determine a BS Rx beam for uplink reception based on a UE's downlink measurement of one or more BS Tx beams; or 2) a BS is able to determine a BS Tx beam for downlink transmission based on the BS's uplink measurement on one or more BS Rx beams.

Further, a UE is capable or has the capability of Tx/Rx beam correspondence if at least one of the following is satisfied: 1) a UE is able to determine a UE Tx beam for uplink transmission based on the UE's downlink measurement on one or more UE Rx beams; or 2) a UE is able to determine a UE Rx beam for downlink reception based on a BS's uplink measurement of one or more UE Tx beams.

In certain aspects, a UE may report its beam correspondence capability to a BS upon receiving an explicit request from the BS such as described in 3GPP TS 38.331. Further, the reported beam correspondence capability may only be a 1-bit value indicating whether the UE operates with or without beam correspondence for all the beams (Rx/Tx) of the UE. The BS may then select different beam management approaches based on a UE's reported capability.

In certain aspects, a number of different approaches may be taken by a BS for UL beam management depending on a UE's beam correspondence capability. For example, if the UE is capable of operating with beam correspondence, a UL Tx beam direction (e.g., corresponding to a UE Tx beam) can be determined by the UE based on a Rx beam direction (e.g., corresponding to a UE Rx beam) over which the UE measures a DL reference signal such as a synchronization signal block (SSB) or channel state information reference signal (CSI-RS) (e.g., with a particular signal quality (e.g., highest signal quality) and which the UE selects to use for reception on the DL). In this example, the UE may utilize the best DL Rx beam, or a DL Rx beam over which a reference signal is measured that satisfies a threshold, found by a DL beam sweeping procedure as the UL Tx beamformed UL Tx beam, and a separate UL beam sweeping procedure may not be needed.

Alternatively, in accordance with another example, if a UE lacks beam correspondence, a UL Tx beam direction may instead be determined by a UL beam sweeping procedure using sounding reference signal (SRS) signaling from the UE to the BS, where the BS then measures the SRS across the different UL Tx beams to select a UL Tx beam. In this case, the selected DL Rx beam found by DL beam sweeping procedure may not be the best Tx beam for UL, and a separate UL beam sweeping procedure is used.

For example, certain aspects provide a parameter called spatialRelationInfo that is indicated by a BS to a UE that indicates a reference signal for the UE to use to transmit for UL beam sweeping. The BS may configure the spatialRelationInfo to the UE for physical uplink control channel (PUCCH) and SRS by radio resource control (RRC) signaling. The reference signal may be an SSB-index, CSI-RS-ResourceId, or SRS-ResourceId. Further, in one or more examples, a Tx beam for the UE to transmit on the physical uplink shared channel (PUSCH) is determined based on SRS if Service Request Indicator (SRI) is indicated in downlink control information (DCI) or PUCCH otherwise.

In certain aspects, a UE may report a beam correspondence capability to a BS, such as in an RRC UECapabilityInformation message. For example, the UE sends the RRC UECapabilityInformation message to the BS based on receiving a UECapabilityEnquiry message from the BS, typically during an initial registration process of the UE with the network including the BS. This reporting simply indicates to the BS whether the UE may operate with beam correspondence or without beam correspondence. For example, when beam correspondence capability is carried by a RRC-layer UECapabilityInformation message it is semi-static, and updating a capability value involves higher layer procedures such as a non-access stratum (NAS) procedure and may result in a new RRC connection.

However, depending on the implementation, a UE may have different beam correspondence states over different sets of beams or even over different beam pattern regions of a beam (e.g., due to a coupling effect between cross-polarization antennas, a beam may have correspondence only over a region, such as within X dB, of its max gain). Further, due to mobility and/or rotation of the UE, the beam correspondence state may change over time as well, such as from the state at the time of initial registration. Further, the beam correspondence state may change depending on the selected subarray or panel of antennas used by the UE for reception, and/or the angle of arrival (AoA) of received signals. To address these issues, aspects as described herein support dynamic reporting of a beam correspondence state. In particular, certain aspects described herein support such dynamic reporting of beam correspondence state instead of semi-static reporting of beam correspondence states.

For example, in accordance with one or more aspects as described herein, a UE may be provided that transmits an indication transmission that indicates at least one beam correspondence state (e.g., whether there is or is not beam correspondence) for one or more beams to a BS. The beam correspondence indication transmission may be triggered by an event occurring at the UE, independent of signaling from a BS. In some cases the UE may provide, in addition to the indication of the beam correspondence state, indication of additional correspondence information indicating an associated one or more beams for the indicated correspondence state (e.g., to which one or more beams the at least one beam correspondence state applies).

In one or more cases, a BS may receive, from a UE, the indication of at least one beam correspondence state of the UE. The indication may be based on a triggering event detected by the UE independent of messaging from the BS. The indication indicates whether or not the UE is capable of beam correspondence between a transmit beam and a receive beam of the UE. The BS can then select an approach for uplink (UL) beam management based on the indication of the at least one beam correspondence state, such as among the beam management approaches discussed. It should be noted that though certain aspects of beam correspondence and reporting beam correspondence are described with respect to a UE and BS, such aspects are similarly applicable to other appropriate wireless devices.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, the wireless communication network 100 may be a New Radio (NR) or 5G network. As shown, one UE 120a is specifically shown as including a beam correspondence manager and is configured to transmit an indication transmission that indicates at least one beam correspondence state for one or more beams to BS 110a. Generation and transmission of the indication transmission may be controlled by the beam correspondence manager. The beam correspondence indication transmission may be triggered by an event occurring at the UE 120a, independent of signaling from a BS, and/or may further include additional correspondence information indicating an associated one or more beams for the indicated correspondence state. Similarly, BS 11a includes a beam correspondence manager and is configured to transmit an indication transmission that indicates at least one beam correspondence state for one or more beams of the BS 110a. Generation and transmission of the indication transmission may be controlled by the beam correspondence manager.

As illustrated in FIG. 1, the wireless communication network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. In some examples, a cell may not necessarily be stationary, and the geographic area of the cell may move according to the location of a mobile BS. In some examples, the BSs may be interconnected to one another and/or to one or more other BSs or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

NR may utilize OFDM with a CP on the uplink and downlink and include support for half-duplex operation using TDD. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

In FIG. 1, a solid line with double arrows indicates desired transmissions between a UE and a serving BS, which is a BS designated to serve the UE on the downlink and/or uplink. A finely dashed line with double arrows indicates potentially interfering transmissions between a UE and a BS.

Figure 2:
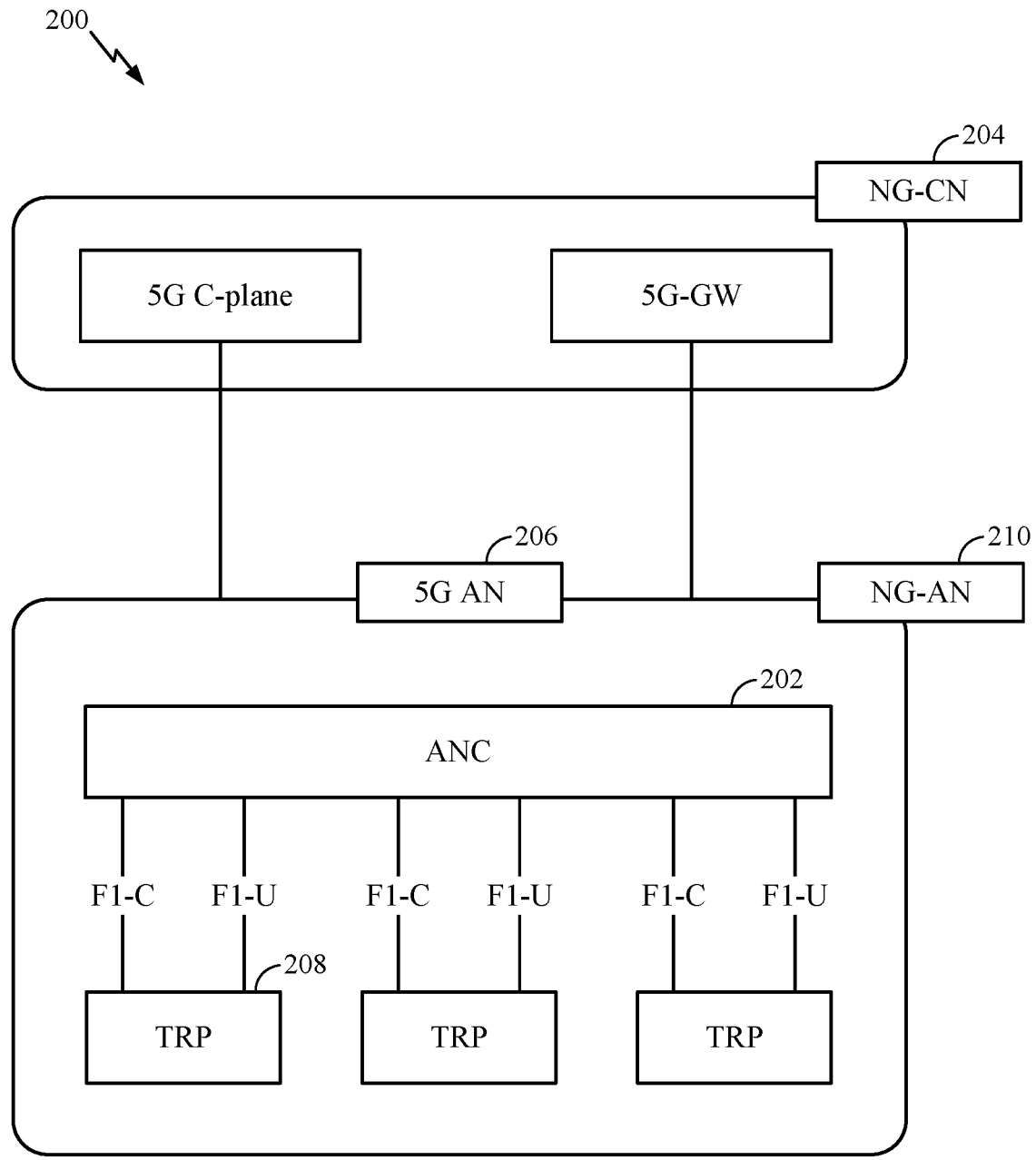
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more transmission reception points (TRPs) 208 (e.g., cells, BSs, gNBs, etc.).

The TRPs 208 may be distributed units (DUs). TRPs 208 may be connected to a single ANC (e.g., ANC 202) or more than one ANC (not illustrated). For example, for RAN sharing, radio as a service (RaaS), and service specific ANC deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
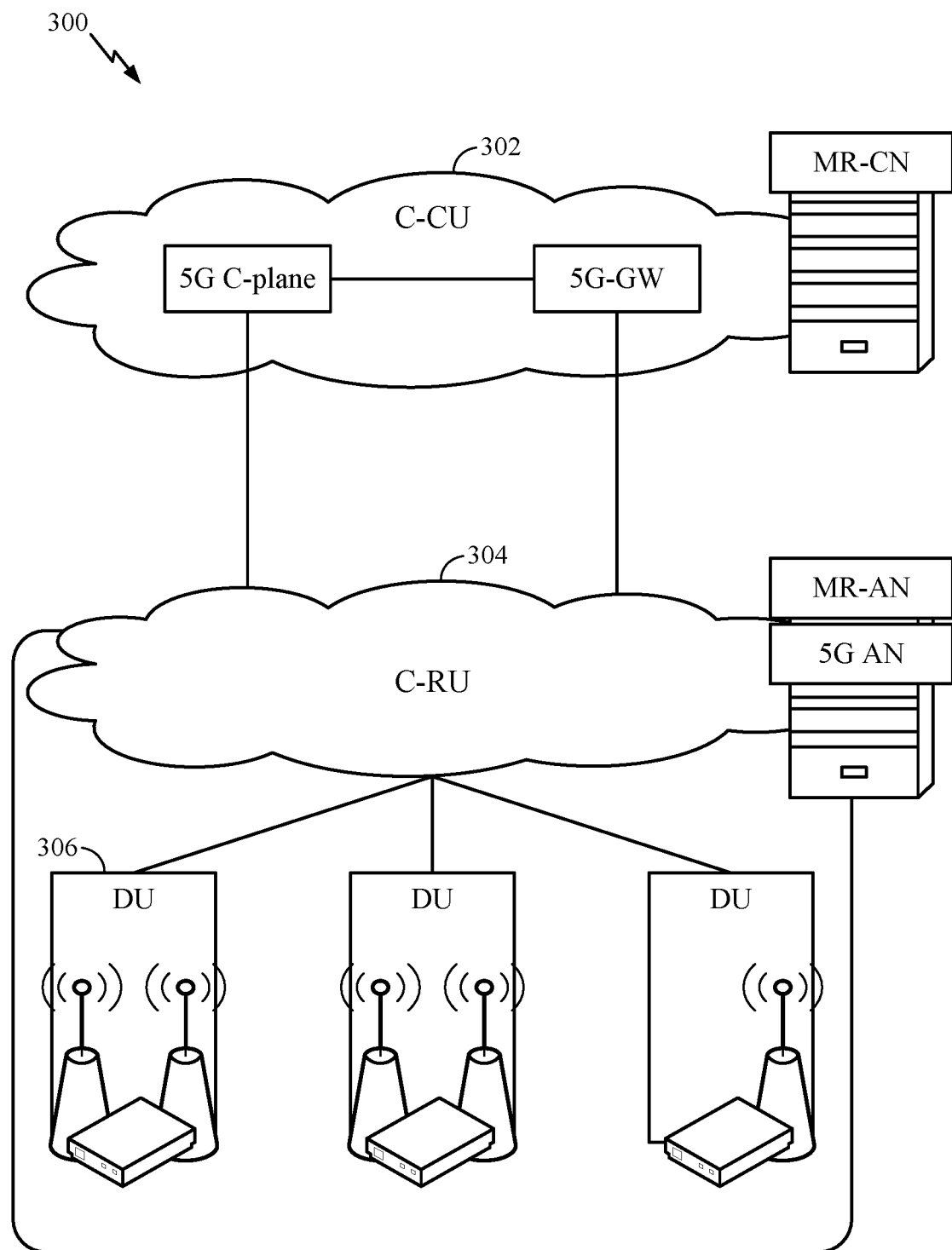
FIG. 3 is a diagram illustrating an example physical architecture of a distributed RAN, in accordance with certain aspects of the present disclosure.

FIG. 3 illustrates an example physical architecture of a distributed Radio Access Network (RAN) 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
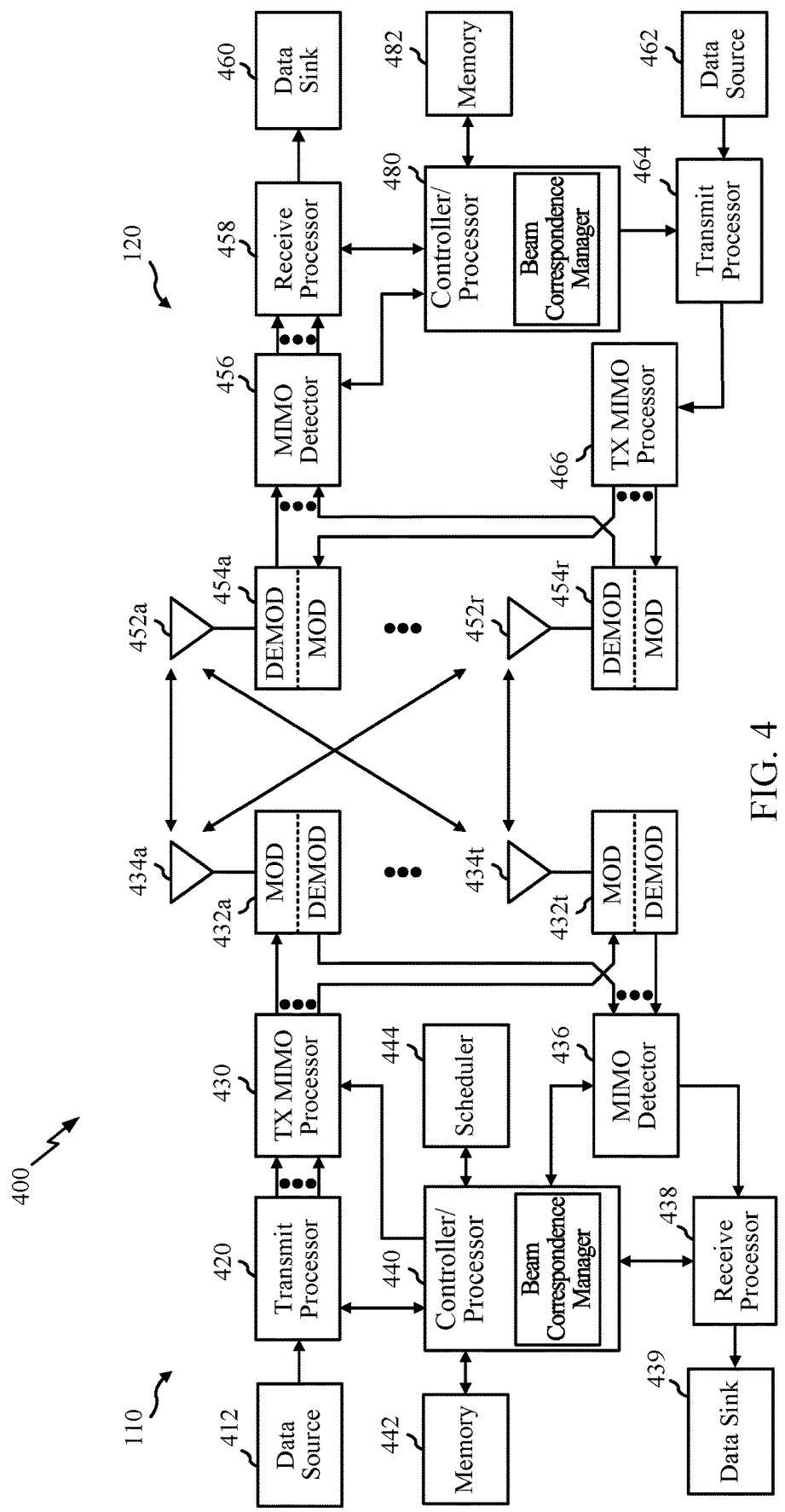
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 430, 438, and/or controller/processor 440 of the BS 110 may be used to perform the various techniques and methods described herein. For example, controller/processor 440 of BS 110 includes a beam correspondence manager configured to control beam correspondence reporting of the BS 110 according to aspects discussed herein. For example, controller/processor 480 of UE 120 includes a beam correspondence manager configured to control beam correspondence reporting of the UE 120 according to aspects discussed herein.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DE-MODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH)) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
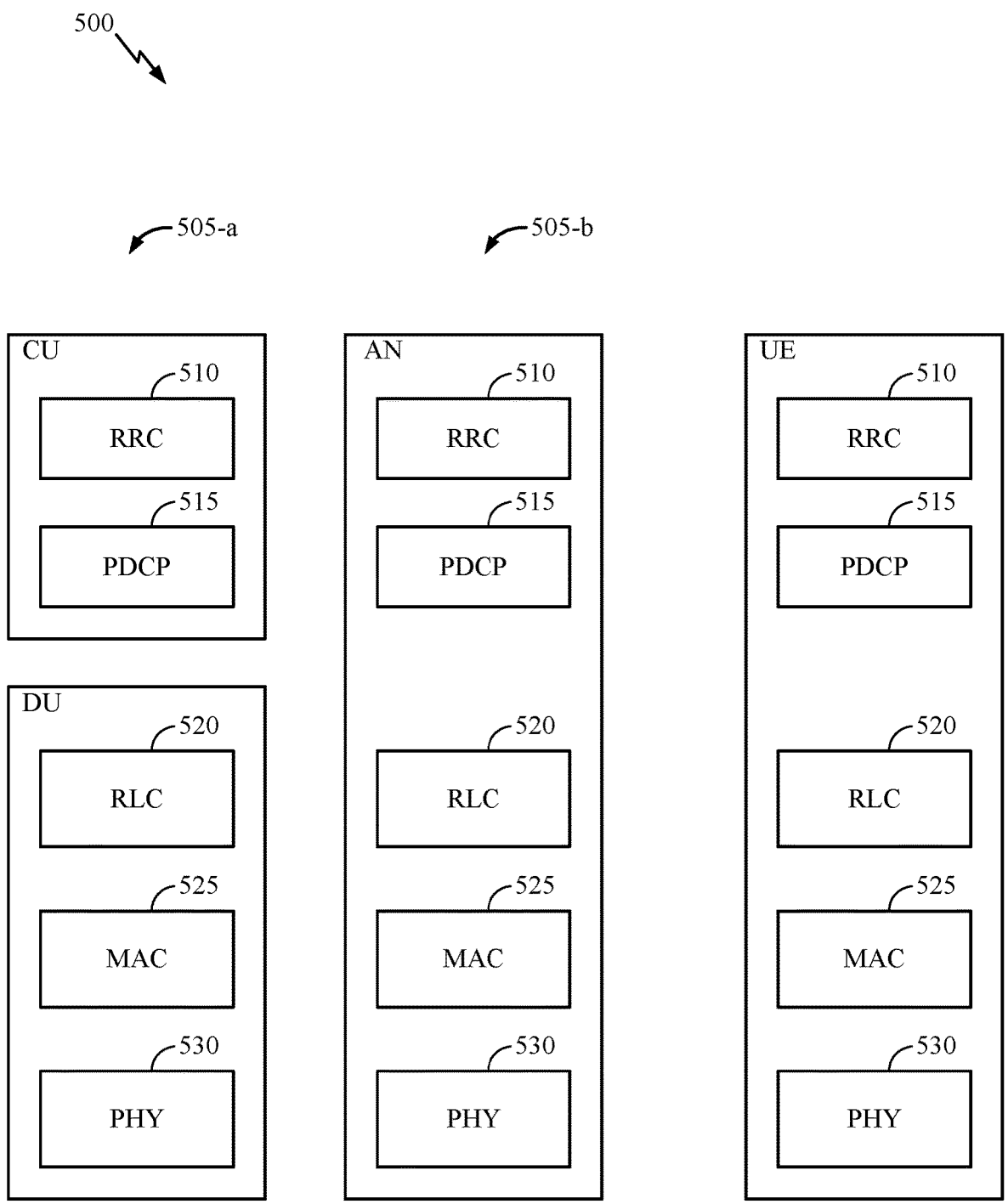
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
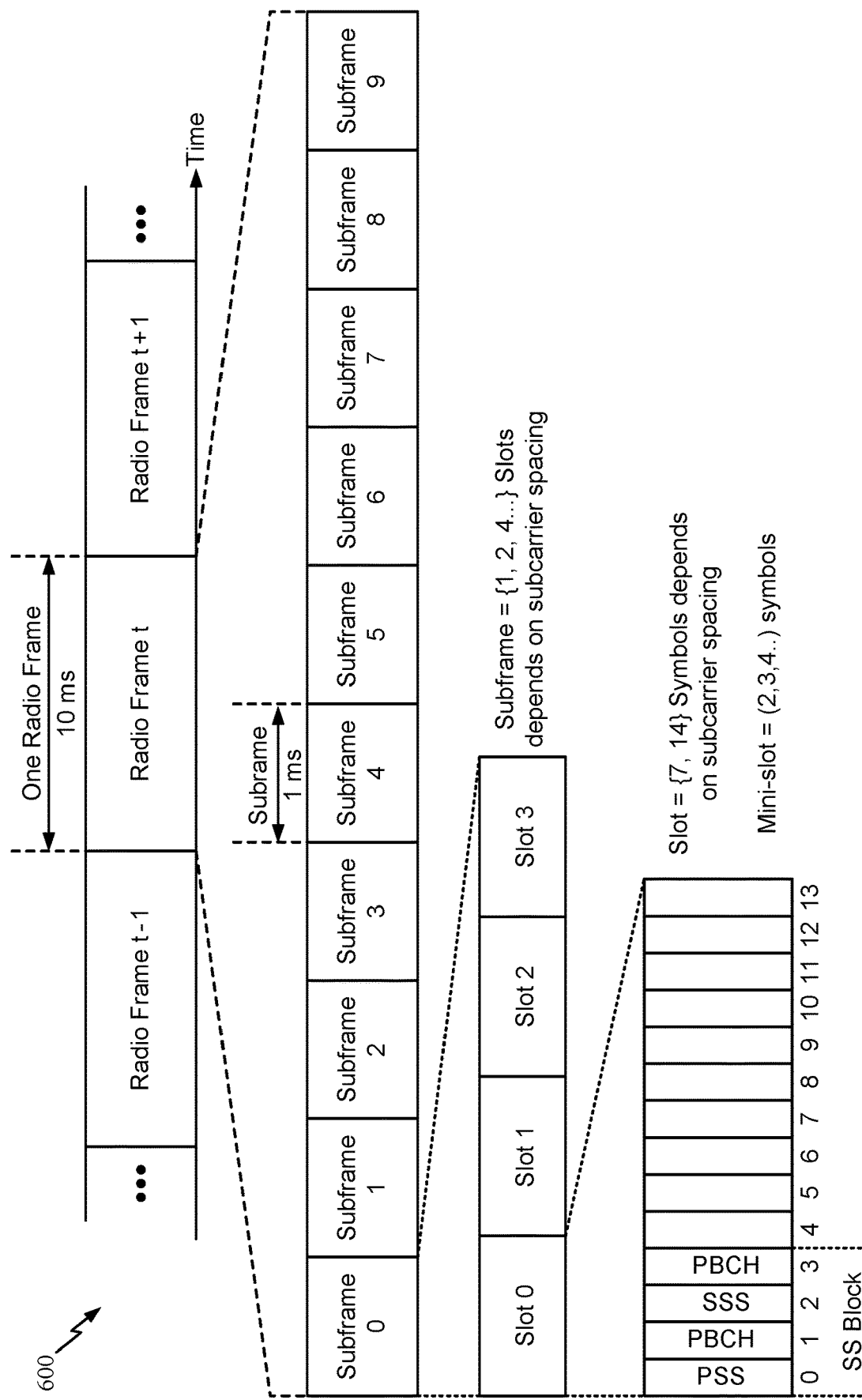
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block (SSB) is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block may be transmitted up to sixty-four times, for example, with up to sixty-four different beam directions for mmW. The up to sixty-four transmissions of the SS block are referred to as the SS burst set.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Reporting of Beam Correspondence States

As discussed, beam correspondence of a device may be determined based on a number of different factors and/or parameters of a device and/or environment. For example, beam correspondence capability may be driven by hardware properties of a device. In particular, a lack of beam correspondence can be caused by the mismatch on Tx and Rx chains of the device (e.g., chain of components used to process signals for transmission/reception as discussed with respect to FIG. 4). For example, a low-noise amplifier (LNA) in an Rx chain may be provided in a device while a power amplifier (PA) may be provided in TX chain which are different from each other. In another example, impact of coupling between cross-polarization antennas may be different for a Tx chain as compared to an Rx chain.

Figure 7:
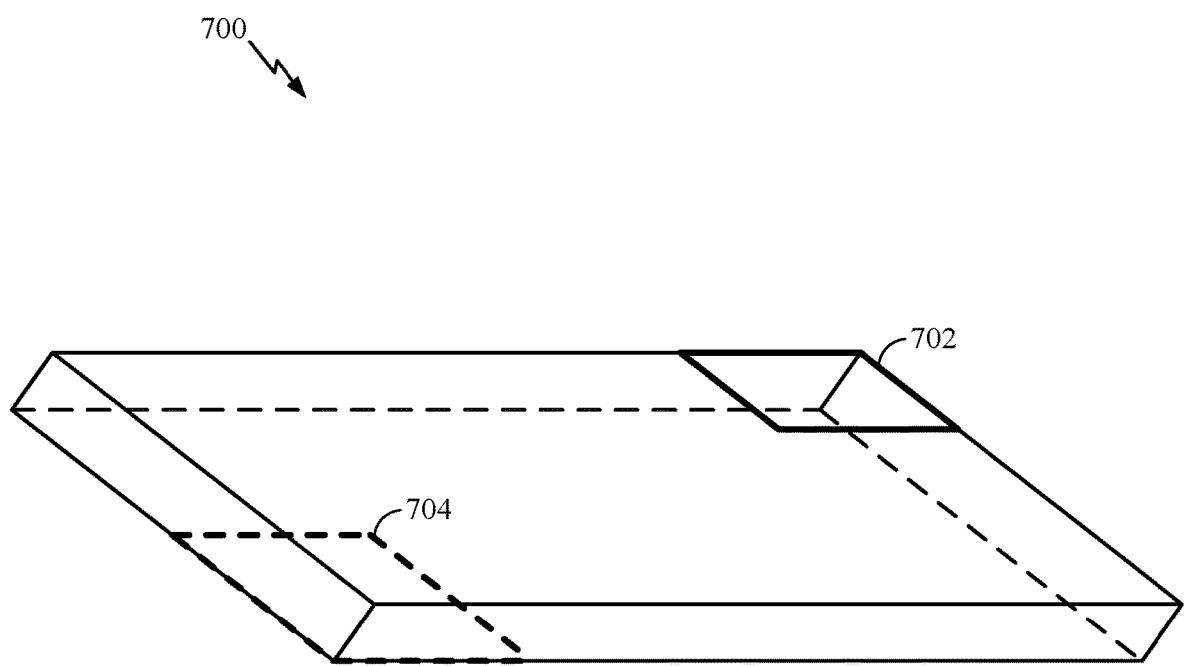
FIG. 7 illustrates an example of different subarrays with different beam correspondence capabilities, in accordance with certain aspects of the present disclosure.

In some aspects, beam correspondence state of the device may change over time due to mobility/rotation of the device. For example, the beam correspondence may change depending on the selected subarrays and/or panels of antennas used for reception of signals and/or the Angle of Arrival (AoA) of received signals. For example, FIG. 7 illustrates an example of a UE 700 with different subarrays and/or panels 702 and 704 with different beam correspondence capabilities, in accordance with certain aspects of the present disclosure.

Figure 8:
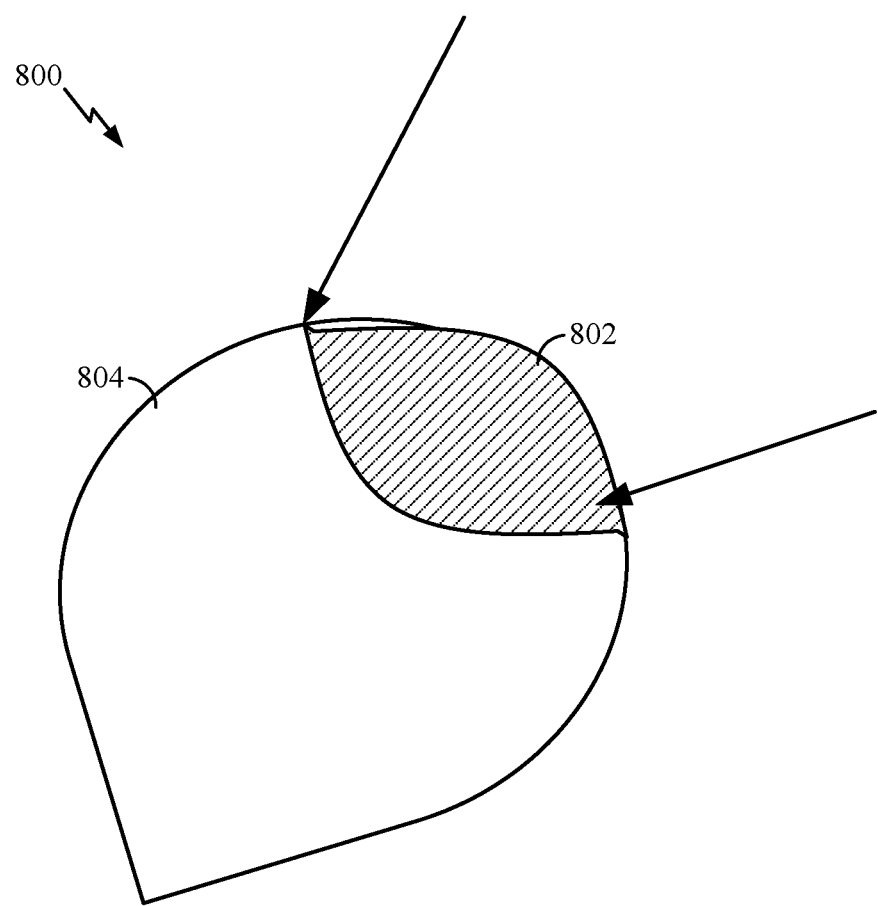
FIG. 8 illustrates an example of different angular regions of a beam with different beam correspondence states, in accordance with certain aspects of the present disclosure.

Further, in some aspects, depending on hardware implementation, a device may have different beam correspondence states over different sets of beams. For example, Rx beams associated with different subarrays and/or panels of antennas (e.g., Rx beams corresponding to reception of signals performed using different subarrays and/or panels) may have different beam correspondence. In some aspects, different beam correspondence states may be determined based on different beam pattern regions of a beam. An example of such regions is shown in FIG. 8. In particular, FIG. 8 illustrates an example of different angular regions 802 and 804 of a beam 800 with different beam correspondence states, in accordance with certain aspects of the present disclosure. In another example, due to a coupling effect between cross-polarization antennas, a beam may have beam correspondence only over a region (e.g., within X dB of its max gain); and may not have beam correspondence outside the region.

Therefore, in view of the above considerations, one or more aspects propose new signaling messages for reporting of beam correspondence states from one wireless device to another, such as from a UE to a BS, a BS to a UE, a UE to a UE, a BS to a BS, etc. Such aspects provide certain advantages in that beam correspondence state can be updated dynamically or separately defined for different beams/portions of beams. Accordingly, even if some beams (e.g., subset of all beams) or portions of beams do not support beam correspondence, the UE can still indicate beam correspondence for those beams or portions of beams, even if all the beams at the UE do not support beam correspondence. Thus, instead of the UE having to use beam sweeping procedures to determine Tx and/or Rx beams for all beams separately, the UE can selectively use beam sweeping procedures as needed for those beams that do not support beam correspondence, while not using certain beam sweeping procedures for those beams that do support beam correspondence. This can help reduce the use of network bandwidth in the communication system for performing beam sweeping as additional reference signals do not need to be transmitted, and therefore improves throughput and functionality of the communication network.

In certain aspects, support for a number of new signaling messages for a first wireless device, such as a UE, to dynamically report beam correspondence state to a second wireless device, such as a BS, may be provided. For example, in one or more aspects, dynamic reporting may be provided. In one aspect, a UE may include a new field, beam correspondence state, for each reported DL UE Rx beam in an L1 beam management report that indicates the beam correspondence state (e.g., with beam correspondence or without beam correspondence) for the UE Rx beam. In some aspects, a dynamic report may be provided in a UL signaling message such as a RRC or in a UL MAC CE. The UL signaling message may indicate a single beam correspondence state for all beams of the UE, a single beam correspondence state and a subset of beams of the UE associated with that single beam correspondence state, or multiple beam correspondence states and the subsets of beams associated with different beam correspondence states.

Figure 9A:
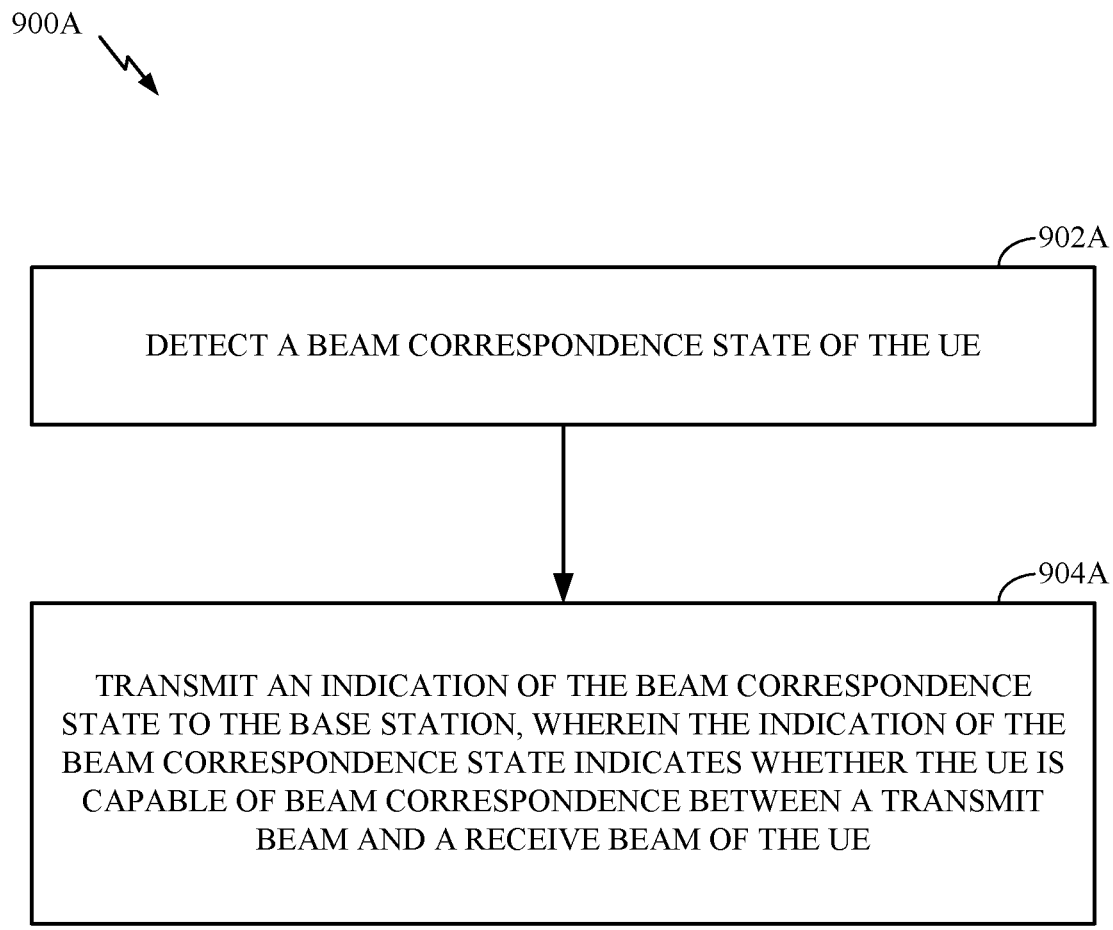
FIG. 9A illustrates example operations for wireless communications by a user equipment (UE), in accordance with certain aspects of the present disclosure.

For example, FIG. 9A illustrates example operations for wireless communications by a user equipment (UE), in accordance with certain aspects of the present disclosure. According to certain aspects, operations 900A may be performed by a user equipment (e.g., one or more of the UEs 120).

Operations 900A begin at 902A where the UE detects a beam correspondence state of the UE. At 904A, the UE transmits an indication of the beam correspondence state to the base station, wherein the indication of the beam correspondence state indicates whether the UE is capable of beam correspondence between a transmit beam and a receive beam of the UE. In some aspects, the transmitting of the indication of the beam correspondence state is triggered by a triggering event detected by the UE. In some aspects, being independent of messaging from a base station may include not receiving a request from the base station.

In some aspects, the triggering event may include the UE first connecting to a network served by the base station (e.g., upon initial registration). The triggering event may include a change of the at least one beam correspondence state of the UE (e.g., due to movement/rotation of the UE a different portion of a beam is used). The triggering event may include a change in an associated set of reference beams (e.g., different beams are used due to movement/rotation of the UE). Though the beam correspondence is about a relationship between a transmit beam and a receive beam of the UE, because a BS has no notion of the UE side's beam, the associated set of reference beams may refer to "BS side DL reference beam". For example, a UE may report that the UE has beam correspondence over a set of beams for reception of SSB index {I1, I2}. This means that at the UE side, the UE can use the same beam weight to generate its Tx beam as its Rx beam for reception of SSB index I1 or I2. The associated set of reference beams includes one or more beams that correspond with the at least one beam correspondence state. In some aspects, the method may further include determining the at least one beam correspondence state based on an antenna selected at the UE for reception, wherein the triggering event comprises changing, by the UE, the antenna selected for reception.

In some aspects, the indication may include an uplink (UL) signaling message. The UL signaling message may be carried by one of a radio resource control (RRC) message or a media access control (MAC) control element (CE). In some aspects, the indication indicates a single beam correspondence state only. In some aspects, the indication indicates a single beam correspondence state and an associated set of reference beams. In some aspects, the indication indicates a plurality of beam correspondence states and associated set of references beams for each of the plurality of beam correspondence states.

In some aspects, the plurality of beam correspondence states may include a first beam correspondence state that indicates the UE is capable of beam correspondence over a set of beams that is associated with reception of a set of downlink (DL) reference signals. The plurality may also include a second beam correspondence state that indicates the UE is not capable of beam correspondence over a set of beams that is associated with reception of a set of DL reference signals. In some aspects, transmitting the indication of the beam correspondence state includes, for each candidate downlink (DL) reference signal reported in a beam measurement report, including an indication of the beam correspondence state of the receive (RX) beam used for reception of the candidate DL reference signal in the beam measurement report.

In some aspects, a beam measurement report may be generated by measuring at least one reference signal transmitted by the base station on one or more receive beams of the UE and generating the beam measurement report comprising information indicative of measurements of the at least one reference signal for the one or more receive beams of the UE. In some aspects, the indication of beam correspondence state can be added to the beam measurement report message. Further, transmitting the indication includes transmitting the beam measurement report message comprising the indication to the base station, wherein the indication indicates one or more beam correspondence states associated with the one or more receive beams.

In some aspects, the method may further include determining the one or more beam correspondence states based on an angle of arrival of the at least one reference signal. In some aspects, the method may further include determining whether to transmit the indication in an uplink signaling message (RRC or MAC CE) based on the triggering event or a beam measurement report. In some aspects, the method further includes transmitting a second indication to the base station, the second indication indicating a type of beam correspondence state reporting supported by the UE of a plurality of types of beam correspondence state reporting.

Figure 9B:
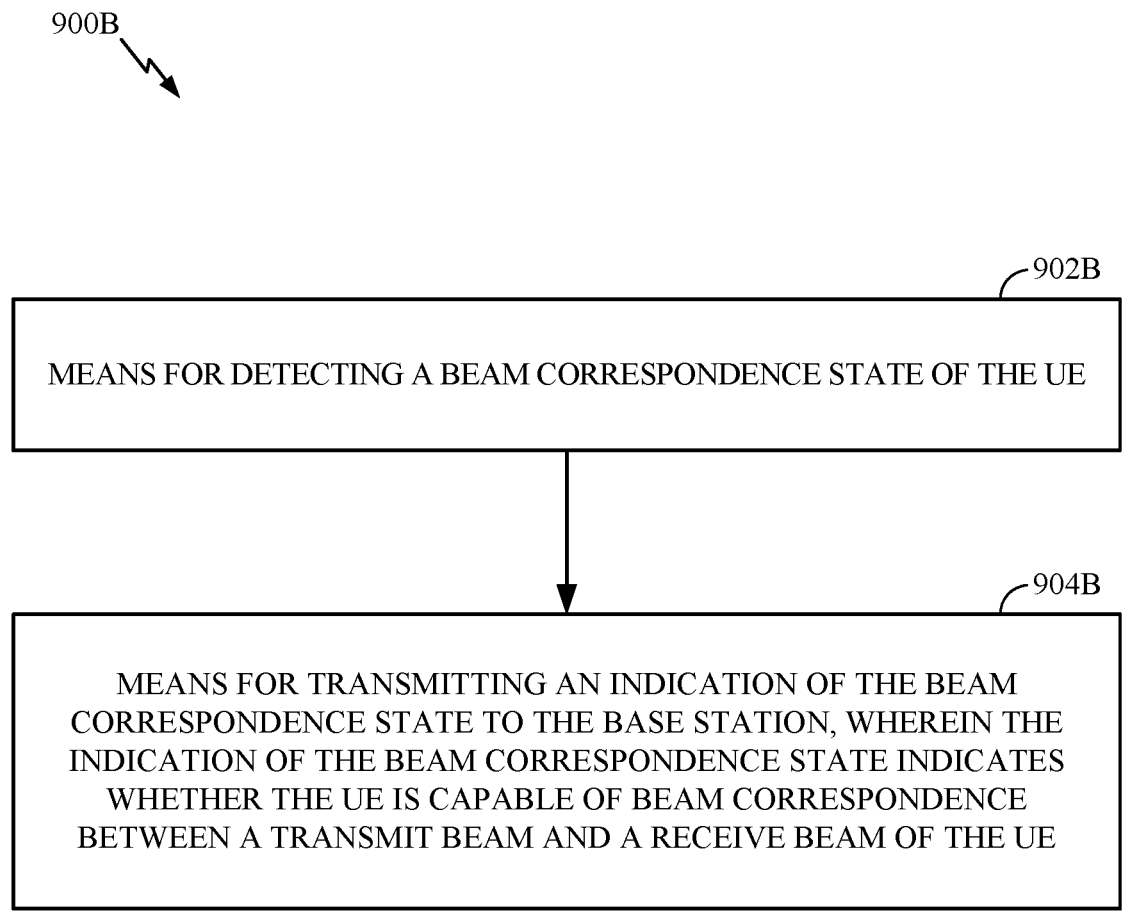
FIG. 9B illustrates example components capable of performing the operations shown in FIG. 9A.

FIG. 9B illustrates example components capable of performing the operations shown in FIG. 9A. For example, the apparatus 900B includes means 902B for detecting a beam correspondence state of the UE. The apparatus 900B further includes means 904B for transmitting an indication of the beam correspondence state to the base station, wherein the indication of the beam correspondence state indicates whether the UE is capable of beam correspondence between a transmit beam and a receive beam of the UE.

Figure 10A:
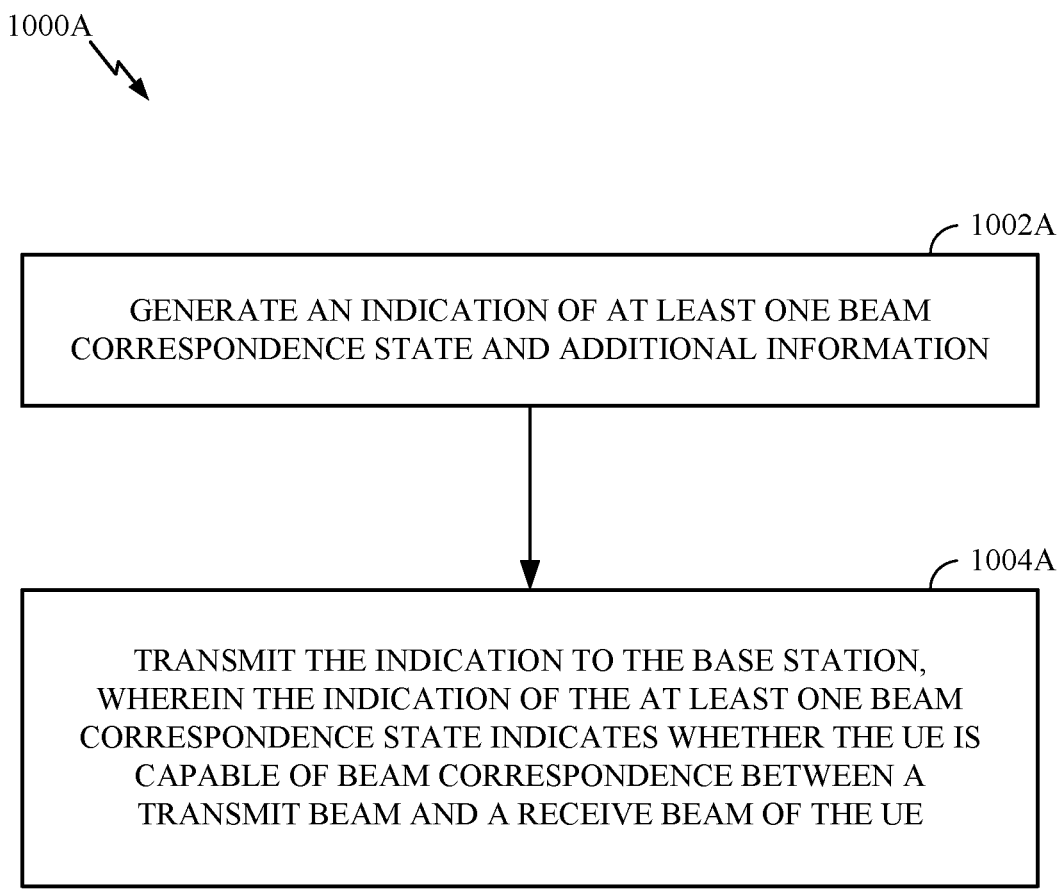
FIG. 10A illustrates example operations for wireless communications by a user equipment (UE), in accordance with certain aspects of the present disclosure.

FIG. 10A illustrates example operations for wireless communications by a user equipment (UE), in accordance with certain aspects of the present disclosure. According to certain aspects, operations 1000A may be performed by a user equipment (e.g., one or more of the UEs 120).

Operations 1000A begin at 1002A where the UE generates an indication of at least one beam correspondence state and additional information. At 1004A, the UE transmits the indication to the base station, wherein the indication of the at least one beam correspondence state indicates whether the UE is capable of beam correspondence between a transmit beam and a receive beam of the UE. In some aspects, the additional information includes an associated set of reference beams for the beam correspondence state. In some aspects, the indication further indicates a second beam correspondence state and a second associated set of reference signals.

Figure 10B:
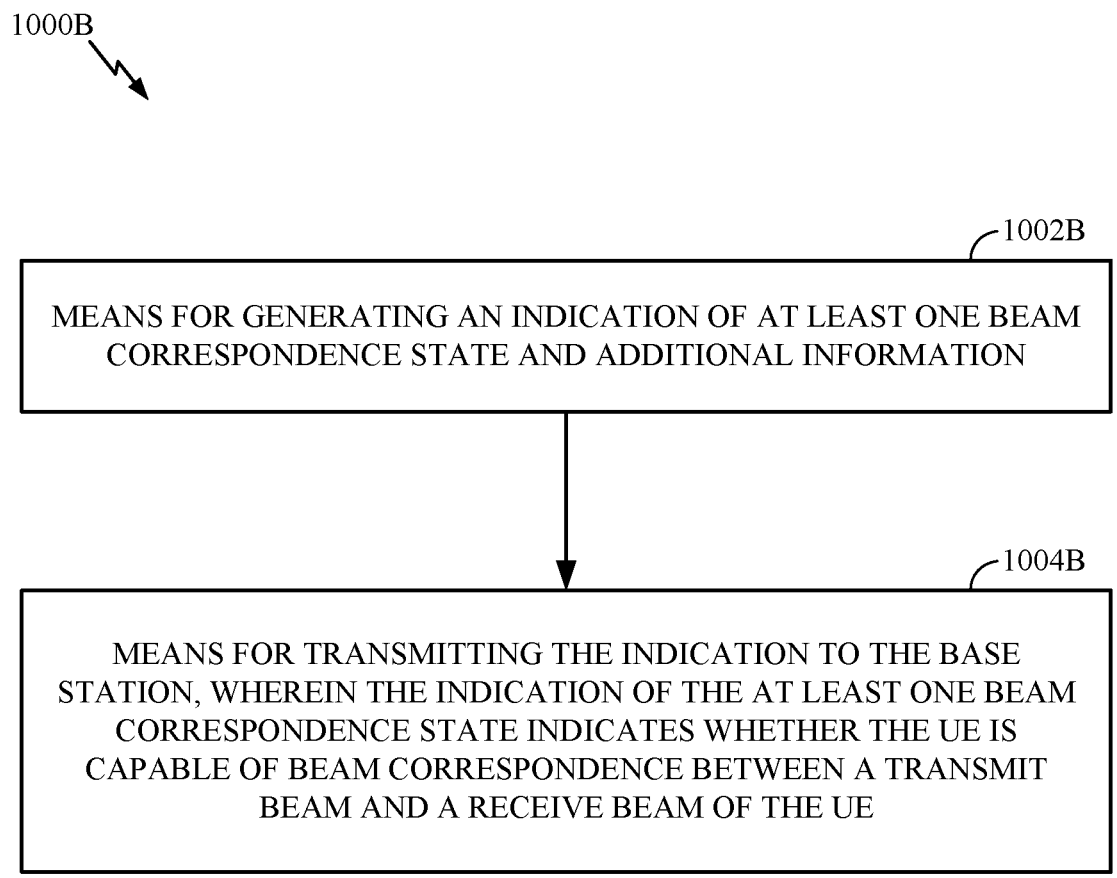
FIG. 10B illustrates example components capable of performing the operations shown in FIG. 10A.

FIG. 10B illustrates example components capable of performing the operations shown in FIG. 10A. For example, the apparatus 1000B includes means 1002B for generating an indication of at least one beam correspondence state and additional information. The apparatus 1000B further includes means 1004B for transmitting the indication to the base station, wherein the indication of the at least one beam correspondence state indicates whether the UE is capable of beam correspondence between a transmit beam and a receive beam of the UE.

Figure 11A:
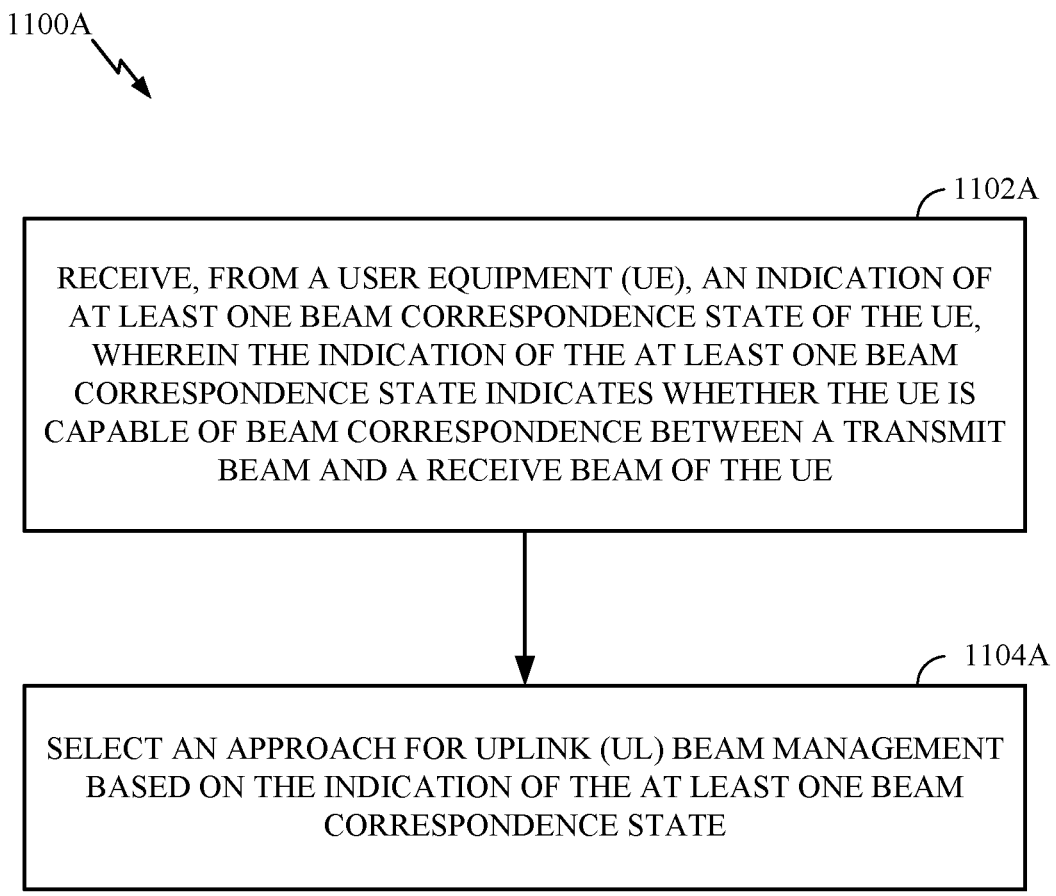
FIG. 11A illustrates example operations for wireless communications by a base station (BS), in accordance with certain aspects of the present disclosure.

FIG. 11A illustrates example operations for wireless communications by a base station (BS), in accordance with certain aspects of the present disclosure. According to certain aspects, operations 1100A may be performed by a BS (e.g., one or more of the BSs 110).

Operations 1100A begin at 1102A where the BS receives, from a user equipment (UE), an indication of at least one beam correspondence state of the UE, wherein the indication of the at least one beam correspondence state indicates whether the UE is capable of beam correspondence between a transmit beam and a receive beam of the UE. At 1104A, the BS selects an approach for uplink (UL) beam management based on the indication of the at least one beam correspondence state.

In some aspects, being independent of messaging from the BS includes not receiving a request from the BS. In some aspects, selecting the approach includes determining the beam correspondence state of the UE over beams corresponding to the reception of at least one downlink (DL) reference signal based on the indication.

In some aspects, selecting the approach may include selecting the approach to be used until another indication of the at least one beam correspondence state is received from the UE. The approach may include at least one of: indicating a first transmit beam of the UE to be used for uplink transmission that can be determined from a downlink (DL) reference signal based on the indication, or configuring an uplink beam sweeping procedure to be performed by the UE.

In some aspects, the indication includes an uplink (UL) signaling message. In some aspects, the UL signaling message is carried by one of a radio resource control (RRC) message or a media access control (MAC) control element (CE). In some aspects, the indication may indicate a single beam correspondence state only. In some aspects, the indication indicates a single beam correspondence state and an associated set of reference beams. In some aspects, the indication indicates a plurality of beam correspondence states and associated set of references beams for each of the plurality of beam correspondence states.

In some aspects, receiving the indication may include receiving a beam measurement report comprising the indication, the beam measurement report further comprising information indicative of measurements of at least one reference signal transmitted by the base station for the one or more receive beams of the UE, wherein the indication indicates one or more beam correspondence states associated with the one or more receive beams.

In some aspects, the method may further include receiving a second indication from the UE, the second indication indicating a type of beam correspondence state reporting supported by the UE of a plurality of types of beam correspondence state reporting.

Figure 11B:
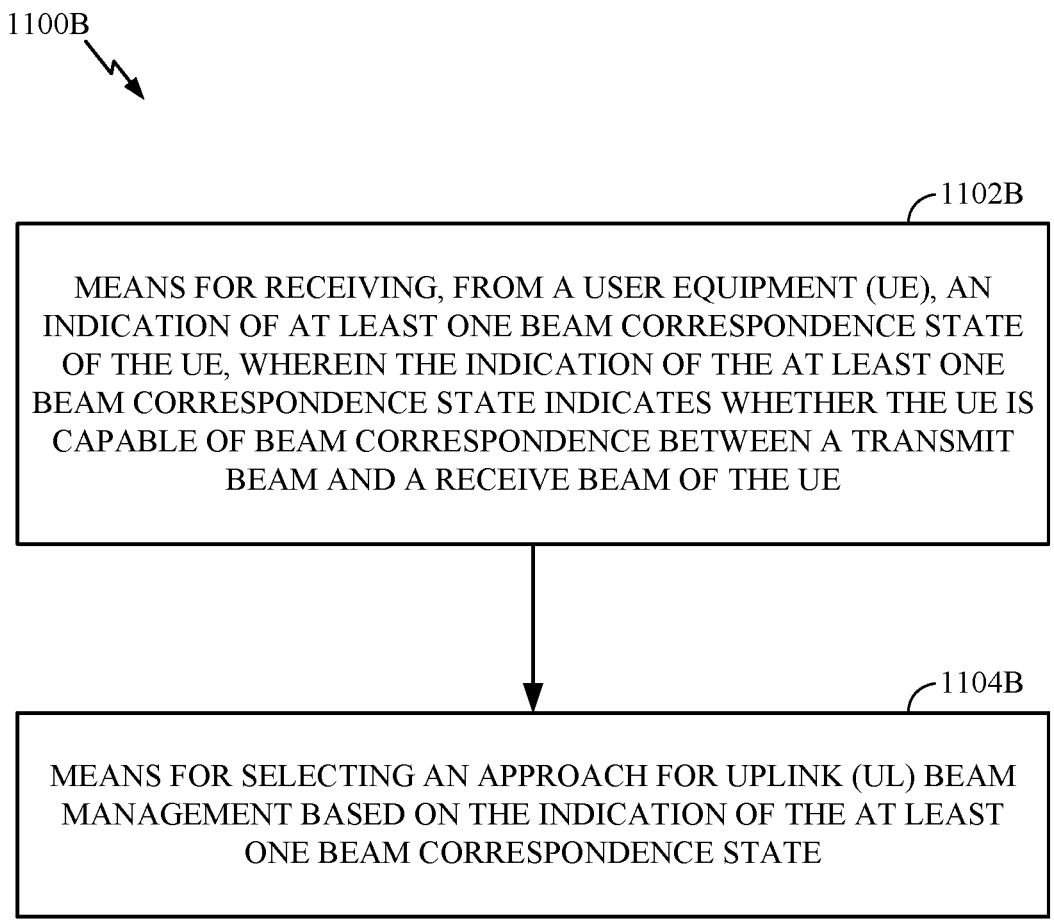
FIG. 11B illustrates example components capable of performing the operations shown in FIG. 11A.

FIG. 11B illustrates example components capable of performing the operations shown in FIG. 11A. For example, the apparatus 1100B includes means 1102B for receiving, from a user equipment (UE), an indication of at least one beam correspondence state of the UE, wherein the indication of the at least one beam correspondence state indicates whether the UE is capable of beam correspondence between a transmit beam and a receive beam of the UE. The apparatus 1100B further includes means 1104B for selecting an approach for uplink (UL) beam management based on the indication of the at least one beam correspondence state.

In one or more aspects, one option that may be provided for reporting beam correspondence from a UE to a BS can include event-triggered reporting. Event triggered reporting may include the UE transmitting a UL signaling message to the BS that indicates one or more beam correspondence states. Further, in some aspects, the signaling may include optional information such as an associated set of reference beams for the one or more beam correspondence states. In some aspects, a reference beam can be indicated using an index of a reference signal such as SSB, CSI-RS, or SRS. In some aspects, the beam correspondence states can include, for example, a state where the UE can support operations "with beam correspondence" or a state where the UE supports operations "without beam correspondence."

In one or more aspects, the signaling message may support one or multiple different formats. For example, a first format that may be supported includes a format that indicates a single beam correspondence state (e.g., for all beams or an implicitly signaled set of beams). A second format that may be supported includes a format that indicates a single beam correspondence state and the associated set of reference beams. A third format that may be supported includes a format that indicates both beam correspondence states and the associated set of reference beams per state. In accordance with one or more aspects, such a signaling message can be carried by RRC or UL MAC CE, which may be triggered by an event.

In accordance with one or more aspects, a number of different triggering events may be used as a trigger. For example, a first triggering event may include when a UE is first connected to the system. Another example of a triggering event may include when a UE's beam correspondence state is changed. Another triggering event may include when the associated set of reference beams is changed. In some aspects, the triggering event is based on UE properties or conditions such as orientation, selection of subarrays and/or panels, etc. In some aspects, the triggering event originates at the UE. In some aspects, the triggering event is initiated by the UE.

In one or more aspects, another option that may be provided can include an enhanced beam measurement report. This report may be provided by enhancing an existing L1 beam measurement report by adding a new field that indicates a "beam correspondence state" for each of the reported DL beams.

Different reporting options may be applicable for different aspects. For example, selecting either reporting using an event-triggered report versus enhancing a beam measurement report may depend on one or more factors that dictate a beam correspondence state and/or mechanisms of a UE for detection of beam correspondence.

For example, in an aspect where a UE's beam correspondence state is associated with a subarray and/or panel that is selected for reception, an event triggered reporting can be used. In particular, the report may be triggered when a subarray and/or panel with different beam correspondence capability is selected for reception.

According to another example, in an aspect where a UE's beam correspondence state is determined based on an Angle of Arrival (AoA) of a received DL signal and the detection of beam correspondence can only be determined upon the reception of DL reference signals, an enhanced beam measurement report can be used and a beam correspondence state can be reported for each beam measurement report.

In one or more aspects, new capability modes can be defined for a UE to indicate which option the UE supports. For example, an existing beam correspondence capability message with 1-bit can be extended with 2-bits to indicate the different options that UE supports. In one example, a value 0 and 1 can be reserved to represent the existing modes (e.g., all beams support beam correspondence or no beams support beam correspondence). Further, a value 2 can represent that a UE supports event-triggered beam correspondence reporting, while value 3 can represent that a UE supports an enhanced beam measurement report.

The proposed signaling messages can be applied for different networks, such as access network, an integrated access and backhaul (IAB) network, etc. For example, in an IAB-network, the term "UE" can refer to a mobile telecommunication (MT) function of an IAB-node and/or the IAB-node may be a wireless device that performs functions discussed herein as performed by a UE.

In some aspects, a BS may take different approaches for UL beam management based on a beam correspondence report. For example, when a L1 beam measurement report is received, a BS can determine the beam correspondence state of each reported DL beam depending on what option is supported. In particular, if event triggered reporting is supported, the state is determined based on the latest beam correspondence report received from UE. If an enhanced beam measurement report is supported, the state may already be indicated by this L1 beam measurement report.

In some aspects, if at least one UE RX beam corresponding to reception of one reported DL beam in a L1 beam measurement report is determined to have beam correspondence, a BS can indicate to the UE that the same beam used for reception of this DL beam should be used for UL transmission, e.g. by configuring spatialRelationInfo for UL transmission with this DL beam, until reception of the next beam correspondence report. In some aspects, if the UE RX beams corresponding to each reported DL beam in a L1 beam measurement report are all determined to have no beam correspondence and no proper UL beam pair has been identified, the BS may configure a UL beam sweeping procedure (either aperiodic or semi-persistent) to determine a proper UL beam pair. Further, in some aspects, if a configured UL beam sweeping procedure is semi-persistent, it can be deactivated upon reception of a new beam correspondence report that indicates at least one DL beam in L1 beam measurement report has beam correspondence.

Figure 12:
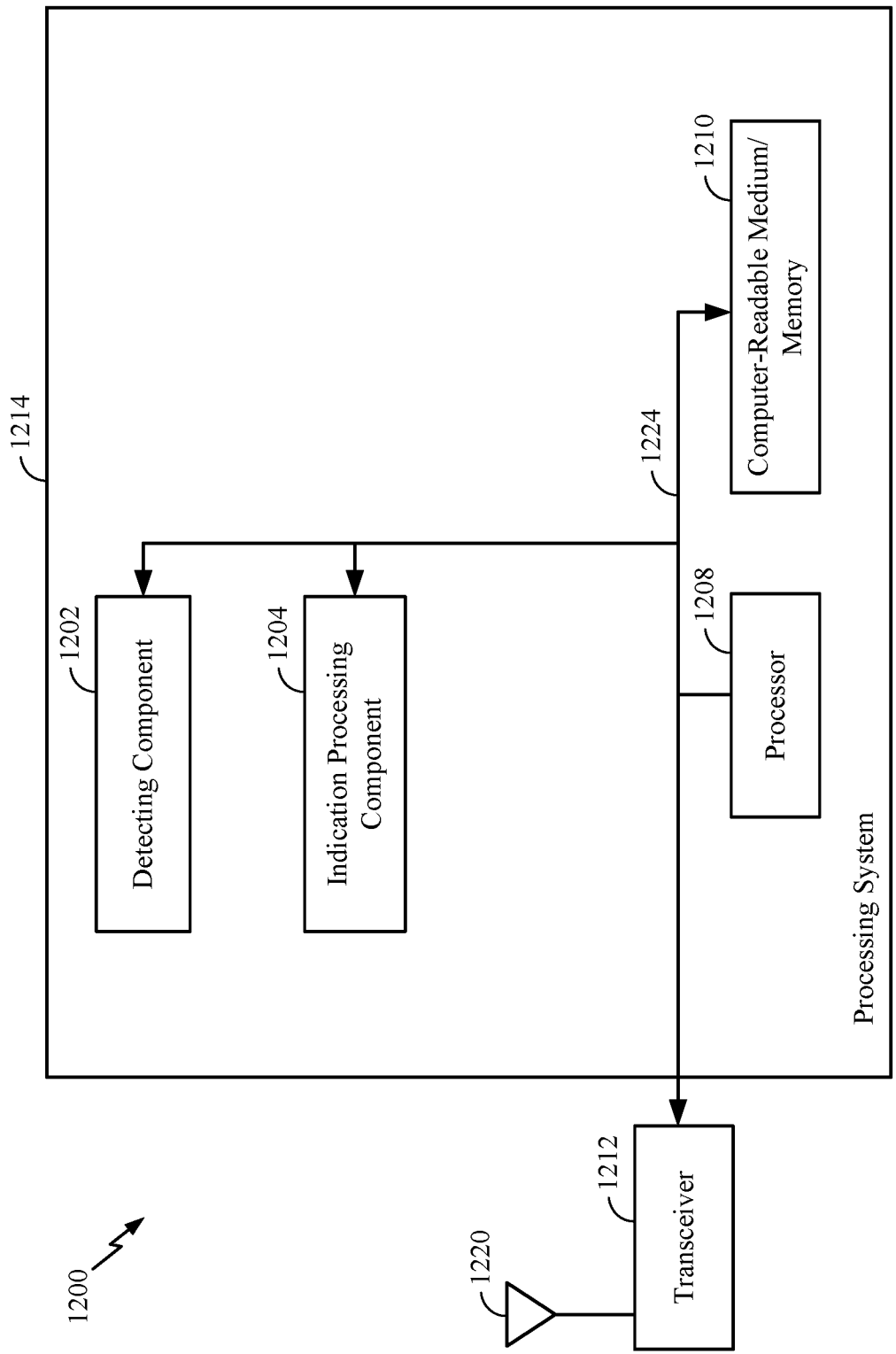
FIG. 12 illustrates a communications device that may include various components configured to perform operations for the techniques described in FIG. 9A in accordance with aspects of the present disclosure.

FIG. 12 illustrates a communications device that may include various components configured to perform operations for the techniques described in FIG. 9A in accordance with aspects of the present disclosure.

Specifically, FIG. 12 illustrates a communications device 1200 that may include various components (e.g., corresponding to means-plus-function components) configured to perform operations for the techniques described herein, such as the operations 900A illustrated in FIG. 9A. The communications device 1200 includes a processing system 1214 coupled to a transceiver 1212. The transceiver 1212 is configured to transmit and receive signals for the communications device 1200 via an antenna 1220, such as the various signal described herein. The processing system 1214 may be configured to perform processing functions for the communications device 1200, including processing signals received and/or to be transmitted by the communications device 1200.

The processing system 1214 includes a processor 1208 coupled to a computer-readable medium/memory 1210 via a bus 1224. In certain aspects, the computer-readable medium/memory 1210 is configured to store instructions that when executed by processor 1208, cause the processor 1208 to perform the operations illustrated in FIG. 9A, or other operations for performing the various techniques discussed herein. In certain aspects, the processing system 1214 further includes a detecting component 1202 for performing the operations illustrated at 902A in FIG. 9A. The processing system 1214 also includes an indication processing component 1204 for performing the operations illustrated at 904A in FIG. 9A.

The detecting component 1202 and indication processing component 1204 may be coupled to the processor 1208 via bus 1224. In certain aspects, the detecting component 1202 and indication processing component 1204 may be hardware circuits. In certain aspects, the detecting component 1202 and indication processing component 1204 may be software components that are executed and run on processor 1208.

Figure 13:
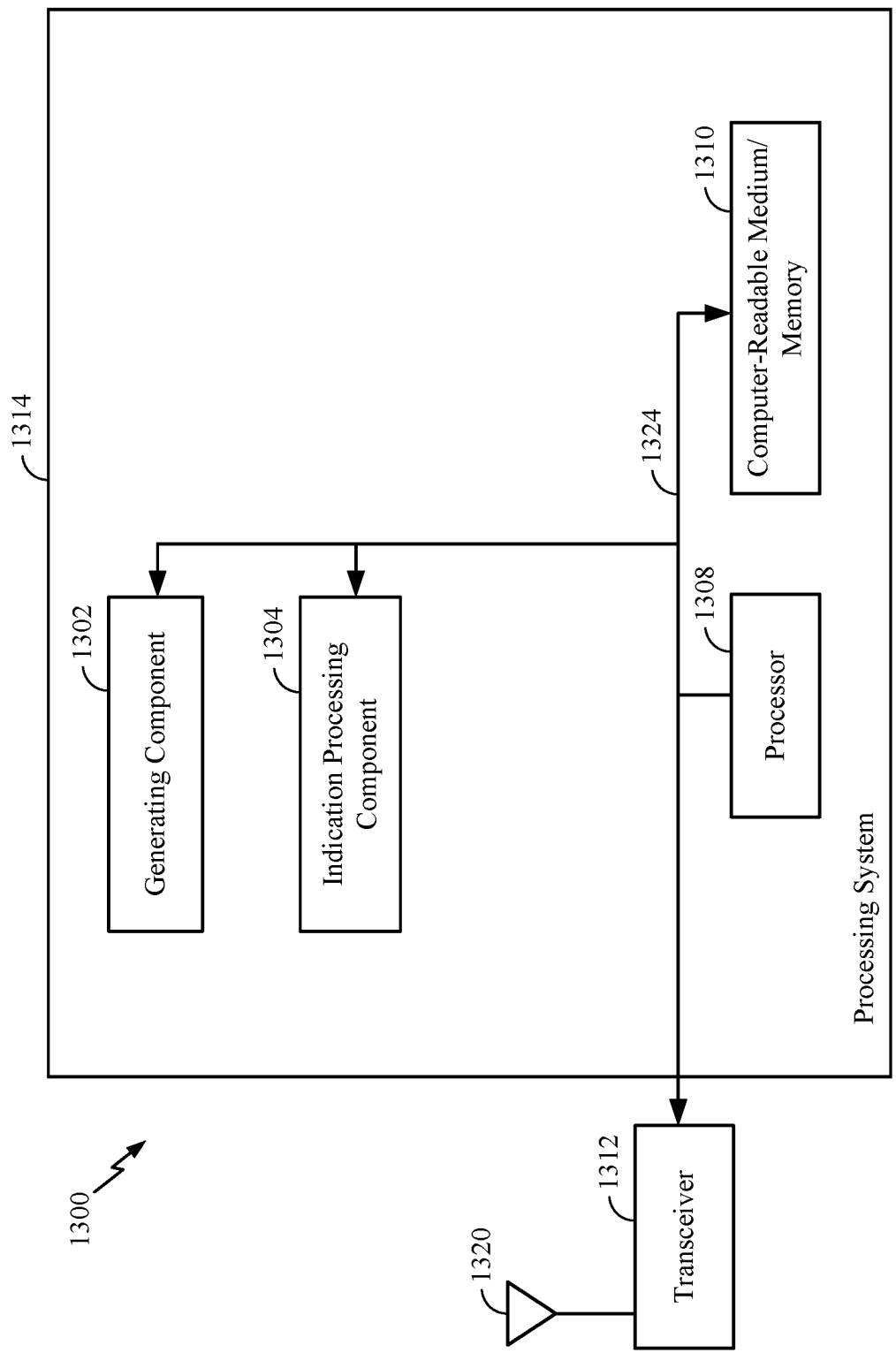
FIG. 13 illustrates a communications device that may include various components configured to perform operations for the techniques described in FIG. 10A in accordance with aspects of the present disclosure.

FIG. 13 illustrates a communications device that may include various components configured to perform operations for the techniques described in FIG. 10A in accordance with aspects of the present disclosure.

Specifically, FIG. 13 illustrates a communications device 1300 that may include various components (e.g., corresponding to means-plus-function components) configured to perform operations for the techniques described herein, such as the operations 1000A illustrated in FIG. 10A. The communications device 1300 includes a processing system 1314 coupled to a transceiver 1312. The transceiver 1312 is configured to transmit and receive signals for the communications device 1300 via an antenna 1320, such as the various signal described herein. The processing system 1314 may be configured to perform processing functions for the communications device 1300, including processing signals received and/or to be transmitted by the communications device 1300.

The processing system 1314 includes a processor 1308 coupled to a computer-readable medium/memory 1310 via a bus 1324. In certain aspects, the computer-readable medium/memory 1310 is configured to store instructions that when executed by processor 1308, cause the processor 1308 to perform the operations illustrated in FIG. 10A, or other operations for performing the various techniques discussed herein. In certain aspects, the processing system 1314 further includes a generating component 1302 for performing the operations illustrated at 1002A in FIG. 10A. The processing system 1314 also includes an indication processing component 1304 for performing the operations illustrated at 1004A in FIG. 10A.

The generating component 1302 and indication processing component 1304 may be coupled to the processor 1308 via bus 1324. In certain aspects, the generating component 1302 and indication processing component 1304 may be hardware circuits. In certain aspects, the generating component 1302 and indication processing component 1304 may be software components that are executed and run on processor 1308.

Figure 14:
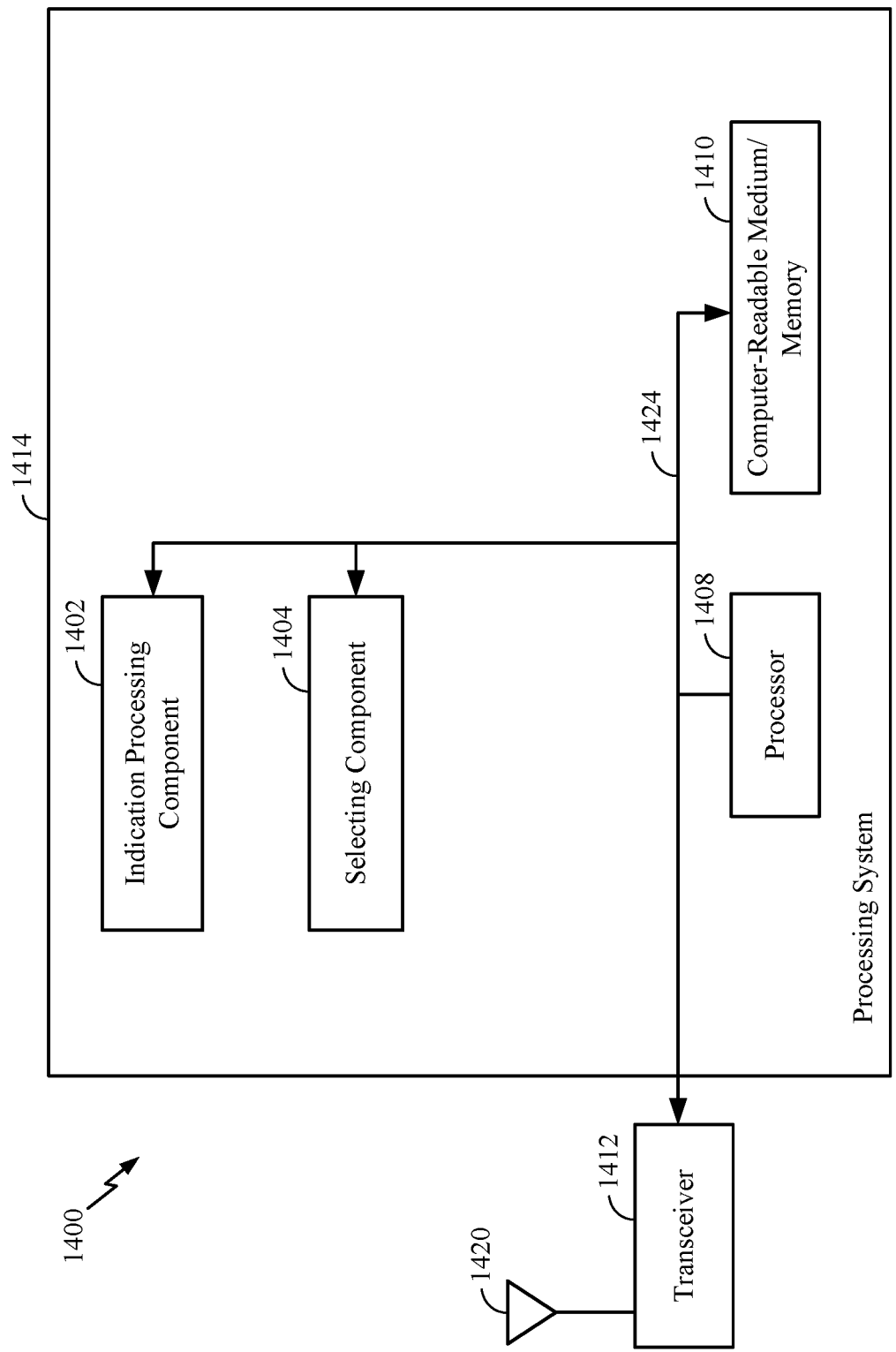
FIG. 14 illustrates a communications device that may include various components configured to perform operations for the techniques described in FIG. 11A in accordance with aspects of the present disclosure.

FIG. 14 illustrates a communications device that may include various components configured to perform operations for the techniques described in FIG. 11A in accordance with aspects of the present disclosure.

Specifically, FIG. 14 illustrates a communications device 1400 that may include various components (e.g., corresponding to means-plus-function components) configured to perform operations for the techniques described herein, such as the operations 1100A illustrated in FIG. 11A. The communications device 1400 includes a processing system 1414 coupled to a transceiver 1412. The transceiver 1412 is configured to transmit and receive signals for the communications device 1400 via an antenna 1420, such as the various signal described herein. The processing system 1414 may be configured to perform processing functions for the communications device 1400, including processing signals received and/or to be transmitted by the communications device 1400.

The processing system 1414 includes a processor 1408 coupled to a computer-readable medium/memory 1410 via a bus 1424. In certain aspects, the computer-readable medium/memory 1410 is configured to store instructions that when executed by processor 1408, cause the processor 1408 to perform the operations illustrated in FIG. 11A, or other operations for performing the various techniques discussed herein. In certain aspects, the processing system 1414 further includes an indication processing component 1402 for performing the operations illustrated at 1102A in FIG. 11A. The processing system 1414 also includes a selecting component 1404 for performing the operations illustrated at 1104A in FIG. 11A.

The indication processing component 1402 and selecting component 1404 may be coupled to the processor 1408 via bus 1424. In certain aspects, the indication processing component 1402 and selecting component 1404 may be hardware circuits. In certain aspects, the indication processing component 1402 and selecting component 1404 may be software components that are executed and run on processor 1408.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 900A illustrated in FIG. 9A, operations 1000A illustrated in FIG. 10A, and operations 1100A illustrated in FIG. 11A, correspond to means 900B illustrated in FIG. 9B, means 1000B illustrated in FIG. 10B, and means 1100B illustrated in FIG. 11B, respectively.

For example, means for transmitting 904B and/or 1004B, and/or means for receiving 1102B may comprise one or more of a transmit processor 420, a TX MIMO processor 430, a receive processor 438, or antenna(s) 434 of the base station 110 and/or the transmit processor 464, a TX MIMO processor 466, a receive processor 458, or antenna(s) 452 of the user equipment 120. Additionally, means for detecting 902B, means for generating 1002B, and/or means for selecting 1104B may comprise one or more processors, such as the controller/processor 440 of the base station 110 and/or the controller/processor 480 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer.

In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 9A, FIG. 10A, and FIG. 11A.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A first wireless device comprising:
    a memory; and
    one or more processors coupled to the memory, the one or more processors being configured to cause the first wireless device to:
        determine a plurality of beam correspondence states for a plurality of sets of one or more beams or portions of beams the first wireless device is able to use for communication; and
        transmit, to a second wireless device, an indication of the plurality of beam correspondence states and, for each of the plurality of beam correspondence states, an association with one of the plurality of sets, wherein the indication indicates, for each of the plurality of sets, whether the first wireless device has a capability of beam correspondence between the set and one or more transmit or receive beams the first wireless device is able to use for communication.

2. The first wireless device of claim 1, wherein the first wireless device comprises a user equipment (UE) and the second wireless device comprises a network entity.

3. The first wireless device of claim 1, wherein the one or more processors are configured to cause the first wireless device to:
transmit the indication based on occurrence of a triggering event corresponding to a change of at least one beam correspondence state of the first wireless device.

4. The first wireless device of claim 3, wherein:
the triggering event comprises a change in an associated set of reference beams received from the second wireless device.

5. The first wireless device of claim 4, wherein the plurality of sets comprises the associated set of reference beams.

6. The first wireless device of claim 1, wherein the one or more processors are configured to cause the first wireless device to:
select an antenna to use for reception; and
determine the plurality of beam correspondence states based on the selected antenna.

7. The first wireless device of claim 1, wherein:
the indication is included in an uplink (UL) signaling message.

8. The first wireless device of claim 7, wherein:
the UL signaling message comprises one of a radio resource control (RRC) message or a media access control (MAC) control element (CE).

9. The first wireless device of claim 1, wherein the plurality of beam correspondence states comprises:
a first beam correspondence state indicating that the first wireless device has the capability of beam correspondence over a first set of one or more beams associated with reception of a set of downlink (DL) reference signals; and
a second beam correspondence state indicating that the first wireless device does not have the capability of beam correspondence over a second set of one or more beams associated with reception of the set of DL reference signals.

10. The first wireless device of claim 1, wherein the indication indicates, for each candidate downlink (DL) reference signal reported in a beam measurement report, a corresponding beam correspondence state of a receive (RX) beam used for reception of the candidate DL reference signal in the beam measurement report.

11. The first wireless device of claim 1, wherein the one or more processors are configured to cause the first wireless device to determine the plurality of beam correspondence states based on an angle of arrival of at least one reference signal.

12. The first wireless device of claim 1, wherein the first wireless device comprises at least one antenna, and wherein the one or more processors are configured to cause the first wireless device to transmit, via the at least one antenna, a second indication to the second wireless device, the second indication indicating a type of beam correspondence state reporting supported by the first wireless device of a plurality of types of beam correspondence state reporting.

13. The first wireless device of claim 1, wherein the first wireless device is a mobile telecommunication (MT) function of an integrated access and backhaul (IAB)-node.

14. A first wireless device comprising:
a memory; and
one or more processors coupled to the memory, the one or more processors being configured to cause the first wireless device to:
receive, from a second wireless device, an indication of a plurality of beam correspondence states and, for each of the plurality of beam correspondence states, an association with one of a plurality of sets of one or more beams or portions of beams, wherein the indication indicates, for each of the plurality of sets, whether the second wireless device has a capability of beam correspondence between the set and one or more transmit or receive beams the second wireless device is able to use for communication; and
select an approach for beam management for the second wireless device based on the received indication.

15. The first wireless device of claim 14, wherein the approach indicates to perform beam sweeping for one or more first beams without beam correspondence and to use a corresponding beam for one or more second beams with beam correspondence.

16. The first wireless device of claim 14, wherein the first wireless device comprises a network entity and the second wireless device comprises a user equipment (UE).

17. The first wireless device of claim 14, wherein:
the indication is included in an uplink (UL) signaling message.

18. The first wireless device of claim 17, wherein:
the UL signaling message comprises one of a radio resource control (RRC) message or a media access control (MAC) control element (CE).

19. The first wireless device of claim 14, wherein the plurality of beam correspondence states comprises:
a first beam correspondence state indicating that the second wireless device has the capability of beam correspondence over a first set of one or more beams associated with reception of a set of downlink (DL) reference signals; and
a second beam correspondence state indicating that the second wireless device does not have the capability of beam correspondence over a second set of one or more beams associated with reception of the set of DL reference signals.

20. The first wireless device of claim 14, wherein the indication indicates, for each candidate downlink (DL) reference signal reported in a received beam measurement report, a corresponding beam correspondence state of a receive (RX) beam used for reception of the candidate DL reference signal in the beam measurement report.

21. The first wireless device of claim 14, wherein the first wireless device comprises at least one antenna, and wherein the one or more processors are configured to cause the first wireless device to receive, via the at least one antenna, a second indication from the second wireless device, the second indication indicating a type of beam correspondence state reporting supported by the second wireless device of a plurality of types of beam correspondence state reporting.

22. The first wireless device of claim 14, wherein the first wireless device is a mobile telecommunication (MT) function of an integrated access and backhaul (IAB)-node.

23. The first wireless device of claim 14, wherein the one or more processors, configured to cause the first wireless device to select the approach, are configured to cause the first wireless device to:
select the approach to be used until another indication of at least one beam correspondence state is received from the second wireless device.

24. The first wireless device of claim 14, wherein the approach for beam management comprises at least one of:
the approach indicates a first transmit beam of the second wireless device to be used for uplink transmission that can be determined from a downlink (DL) reference signal based on the indication; or
the approach indicates to configure an uplink beam sweeping procedure to be performed by the second wireless device.

25. A method for wireless communication by a first wireless device, the method comprising:
determining a plurality of beam correspondence states for a plurality of sets of one or more beams or portions of beams the first wireless device is able to use for communication; and
transmitting, to a second wireless device, an indication of the plurality of beam correspondence states and, for each of the plurality of beam correspondence states, an association with one of the plurality of sets, wherein the indication indicates, for each of the plurality of sets, whether the first wireless device has a capability of beam correspondence between the set and one or more transmit or receive beams the first wireless device is able to use for communication.

26. The method of claim 25, wherein the first wireless device comprises a user equipment (UE) and the second wireless device comprises a network entity.

27. The method of claim 25, wherein the transmitting the indication is based on occurrence of a triggering event corresponding to a change of at least one beam correspondence state of the first wireless device.

28. A method for wireless communication by a first wireless device, the method comprising:
receiving, from a second wireless device, an indication of a plurality of beam correspondence states and, for each of the plurality of beam correspondence states, an association with one of a plurality of sets of one or more beams or portions of beams, wherein the indication indicates, for each of the plurality of sets, whether the second wireless device has a capability of beam correspondence between the set and one or more transmit or receive beams the second wireless device is able to use for communication; and
selecting an approach for beam management for the second wireless device based on the received indication.

29. The method of claim 28, wherein the approach indicates to perform beam sweeping for one or more first beams without beam correspondence and to use a corresponding beam for one or more second beams with beam correspondence.

30. The method of claim 28, wherein the first wireless device comprises a network entity and the second wireless device comprises a user equipment (UE).

31. A non-transitory computer-readable medium comprising executable instructions that, when executed by one or more processors of an apparatus, cause the apparatus to:
determine a plurality of beam correspondence states for a plurality of sets of one or more beams or portions of beams a first wireless device is able to use for communication; and
transmit, to a second wireless device, an indication of the plurality of beam correspondence states and, for each of the plurality of beam correspondence states, an association with one of the plurality of sets, wherein the indication indicates, for each of the plurality of sets, whether the first wireless device has a capability of beam correspondence between the set and one or more transmit or receive beams the first wireless device is able to use for communication.

32. The non-transitory computer-readable medium of claim 31, wherein the executable instructions further cause the apparatus to:
transmit the indication based on occurrence of a triggering event corresponding to a change of at least one beam correspondence state of the first wireless device.

33. The non-transitory computer-readable medium of claim 31, wherein the executable instructions further cause the apparatus to:
select an antenna to use for reception; and
determine the plurality of beam correspondence states based on the selected antenna.

34. The non-transitory computer-readable medium of claim 31, wherein the indication is included in an uplink (UL) signaling message.

35. A non-transitory computer-readable medium comprising executable instructions that, when executed by one or more processors of an apparatus, cause the apparatus to:
receive, at a first wireless device from a second wireless device, an indication of a plurality of beam correspondence states and, for each of the plurality of beam correspondence states, an association with one of a plurality of sets of one or more beams or portions of beams, wherein the indication indicates, for each of the plurality of sets, whether the second wireless device has a capability of beam correspondence between the set and one or more transmit or receive beams the second wireless device is able to use for communication; and
select an approach for beam management for the second wireless device based on the received indication.

36. The non-transitory computer-readable medium of claim 35, wherein the approach indicates to perform beam sweeping for one or more first beams without beam correspondence and to use a corresponding beam for one or more second beams with beam correspondence.

37. The non-transitory computer-readable medium of claim 35, wherein the indication is included in an uplink (UL) signaling message.

38. The non-transitory computer-readable medium of claim 35, wherein the plurality of beam correspondence states comprises:
a first beam correspondence state indicating that the second wireless device has the capability of beam correspondence over a first set of one or more beams associated with reception of a set of downlink (DL) reference signals; and
a second beam correspondence state indicating that the second wireless device does not have the capability of beam correspondence over a second set of one or more beams associated with reception of the set of DL reference signals.

39. The non-transitory computer-readable medium of claim 35, wherein the indication indicates, for each candidate downlink (DL) reference signal reported in a received beam measurement report, a corresponding beam correspondence state of a receive (RX) beam used for reception of the candidate DL reference signal in the beam measurement report.

40. The non-transitory computer-readable medium of claim 35, wherein the first wireless device comprises at least one antenna, and wherein the executable instructions further cause the apparatus to receive, via the at least one antenna, a second indication from the second wireless device, the second indication indicating a type of beam correspondence state reporting supported by the second wireless device of a plurality of types of beam correspondence state reporting.

* * * * *